(12) United States Patent
Domijan, Jr. et al.

(10) Patent No.: US 7,920,997 B2
(45) Date of Patent: Apr. 5, 2011

(54) ELECTRIC POWER DISTRIBUTION INTERRUPTION RISK ASSESSMENT CALCULATOR

(75) Inventors: Alexander Domijan, Jr., Wesley Chapel, FL (US); Arif Islam, Tampa, FL (US)

(73) Assignee: University of South Florida, Tampa, FL (US)

(*) Notice: Subject to any disclaimer, the term of this patent is extended or adjusted under 35 U.S.C. 154(b) by 369 days.

(21) Appl. No.: 12/108,975

(22) Filed: Apr. 24, 2008

(65) Prior Publication Data
US 2008/0319724 A1    Dec. 25, 2008

Related U.S. Application Data

(60) Provisional application No. 60/913,689, filed on Apr. 24, 2007.

(51) Int. Cl.
  *G06F 17/50* (2006.01)
(52) U.S. Cl. ............ 703/2; 703/17; 706/21; 702/3
(58) Field of Classification Search ............ 703/2, 17; 706/21; 702/3
See application file for complete search history.

(56) References Cited

U.S. PATENT DOCUMENTS

| | | | |
|---|---|---|---|
| 6,952,648 B1 | 10/2005 | Menard et al. | |
| 7,010,437 B2 | 3/2006 | Lubkeman et al. | |
| 7,069,258 B1 * | 6/2006 | Bothwell | 706/21 |
| 7,603,259 B2 * | 10/2009 | Jrad et al. | 703/2 |
| 2004/0167731 A1 | 8/2004 | Wang et al. | |
| 2004/0225486 A1 * | 11/2004 | Mullis et al. | 703/18 |
| 2005/0195982 A1 | 9/2005 | Olive | |
| 2006/0184326 A1 * | 8/2006 | McNally et al. | 702/3 |
| 2007/0005680 A1 * | 1/2007 | Jrad et al. | 709/201 |

OTHER PUBLICATIONS

Matavalam. 2004. "Power Distribution Reliability as a Function of Weather." University of Florida, Entire Document, Retrieved from URL: <http://etd.fcia.edu/UF/UFE00066668/matavalam)r.pdf>.

* cited by examiner

*Primary Examiner* — Thai Phan
(74) *Attorney, Agent, or Firm* — Courtney M. Dunn; Smith & Hopen, P.A.

(57) ABSTRACT

Based on common weather conditions, novel methods are disclosed for the prediction of electrical power distribution interruptions and for interruption risk assessment based on immediate weather conditions. Daily, hourly, and bi-hourly weather data are used to predict the number of interruptions and to normalize reliability indices for weather. Common weather conditions include, but are not limited to, rain, wind, temperature, lightning, humidity, barometric pressure, snow, and ice. These conditions do not occur simultaneously at any one place, and the range of combinations is great, therefore the invention allows broad application of the disclosed methods.

36 Claims, 24 Drawing Sheets

| N | %P N or Fewer | %P N or more |
|---|---|---|
| 1 | 0.79 | 100.00 |
| 2 | 3.15 | 99.21 |
| 3 | 8.66 | 96.85 |
| 4 | 13.39 | 91.34 |
| 5 | 24.41 | 86.61 |
| 6 | 33.86 | 75.59 |
| 7 | 48.82 | 66.14 |
| 8 | 58.27 | 51.18 |
| 9 | 69.29 | 41.73 |
| 10 | 78.74 | 30.71 |
| 11 | 84.25 | 21.26 |
| 12 | 89.76 | 15.75 |
| 13 | 94.49 | 10.24 |
| 14 | 96.85 | 5.51 |
| 15 | 98.43 | 3.15 |
| 20 | 100 | 1.58 |

Location and Scale Factors

|  | Rain | Wind | LS | N |
|---|---|---|---|---|
| Location And Scale | $\mu+5.15\sigma$ | $G(p)=2.00$ | $\mu+5.15\sigma$ | $\alpha+0.8\beta$ |
| Percent Under Curve | 99.67 | 86.23 | 99.11 | 79.82 |

FIG. 21

Overall Improvements in rho

| n≈1350 | | | |
|---|---|---|---|
| Avg. 95% Confidence Interval ≈ ρ ± 0.048 | | | |
| | N | CI | CMI |
| Maximum | 0.567 | 0.380 | 0.566 |
| Average | 0.457 | 0.301 | 0.385 |
| Minimum | 0.303 | 0.205 | 0.133 |

FIG. 22

Correlation Magnitude Characterizations

| 0.0-0.1 | 0.1-0.3 | 0.3-0.5 | 0.5-0.7 | 0.7-0.9 |
|---|---|---|---|---|
| Clinically Trivial | Small | Moderate | Large | Very Large |

| A | B | C | D | E |
|---|---|---|---|---|
| Exemplar # | Output1 | Without Exclusions | With Exclusions | Date |
| 1 | 8.74365425 | 5 | 5 | 2/1/2001 |
| 2 | 10.3300438 | 8 | 8 | 2/2/2001 |
| 3 | 8.15869236 | 5 | 5 | 2/3/2001 |
| 4 | 11.05756 | 12 | 12 | 2/4/2001 |
| 5 | 10.3818951 | 7 | 7 | 2/5/2001 |
| 6 | 11.7957258 | 14 | 14 | 2/6/2001 |
| 7 | 10.172533 | 6 | 6 | 2/7/2001 |
| 8 | 8.52805233 | 8 | 8 | 2/8/2001 |
| 9 | 8.61111355 | 12 | 12 | 2/9/2001 |
| 10 | 9.34218216 | 5 | 5 | 2/10/2001 |
| 11 | 8.56932545 | 5 | 5 | 2/11/2001 |
| 12 | 8.67930698 | 9 | 9 | 2/12/2001 |
| 13 | 9.69525528 | 9 | 9 | 2/13/2001 |
| 14 | 8.58688259 | 9 | 9 | 2/14/2001 |
| 15 | 8.83479118 | 9 | 9 | 2/15/2001 |
| 16 | 8.66476917 | | 7 | 2/16/2001 |
| 17 | 10.0920296 | 4 | 4 | 2/17/2001 |
| 18 | 8.72028637 | 3 | 3 | 2/18/2001 |
| 19 | 7.79959631 | 15 | 15 | 2/19/2001 |
| 20 | 8.89314938 | 8 | 8 | 2/20/2001 |
| 21 | 9.27341366 | 3 | 3 | 2/21/2001 |
| 22 | 8.29059219 | 11 | 11 | 2/22/2001 |
| 23 | 8.40765476 | 8 | 8 | 2/23/2001 |
| 24 | 11.0403557 | 23 | 23 | 2/24/2001 |
| 25 | 10.7825413 | 8 | 8 | 2/25/2001 |
| 26 | 9.62258244 | 16 | 16 | 2/26/2001 |
| 27 | 9.78461647 | 7 | 7 | 2/27/2001 |
| 28 | 10.4237928 | 13 | 13 | 2/28/2001 |
| 29 | 12.4851465 | 13 | 13 | 3/1/2001 |
| 30 | 12.052948 | 12 | 12 | 3/2/2001 |
| 31 | 14.4517241 | 5 | 5 | 3/3/2001 |
| 32 | 24.4035836 | 14 | 14 | 3/4/2001 |
| 33 | 31.5893536 | 30 | 30 | 3/5/2001 |
| 34 | 24.5112019 | 14 | 14 | 3/6/2001 |
| 35 | 9.14293671 | 6 | 6 | 3/7/2001 |

N Actual = -0.164610+0.997949 N Predicted
S = 4.54977 R-Sq = 61.3%   R-Sq(adj) = 61.2%

Prediction = 16

FIG. 26D

Prediction = 16

| N | %P N or Fewer | %P N or more |
|---|---|---|
| 5 | 2.17 | 100.00 |
| 6 | 4.35 | 97.83 |
| 7 | 6.52 | 95.65 |
| 8 | 8.70 | 93.48 |
| 9 | 13.04 | 91.30 |
| 10 | 15.22 | 86.96 |
| 11 | 21.74 | 84.87 |
| 12 | 26.09 | 78.26 |
| 13 | 34.78 | 73.91 |
| 14 | 45.65 | 65.22 |
| 15 | 47.83 | 54.35 |
| 16 | 58.70 | 52.17 |
| 17 | 60.87 | 52.17 |
| 18 | 71.74 | 39.13 |
| 19 | 78.26 | 28.26 |
| 20 | 82.61 | 21.74 |
| 21 | 86.96 | 17.39 |
| 22 | 91.30 | 13.04 |
| 23 | 95.65 | 8.70 |
| 25 | 97.83 | 4.35 |
| 37 | 100.00 | 2.17 |

| MA | Date | Max Temp | Min Temp | Avg Temp | Avg Dew | Rain | Avg StPR | 5SMaxS | 2MMaxS | 2MMaxD | Lightning Strikes |
|---|---|---|---|---|---|---|---|---|---|---|---|
| BV | 2/1/2001 | 80 | 62 | 71 | 64 | 0 | 30.05 | 16 | 15 | 5 | 0 |

A

| Exemplar # | Output1 |
|---|---|
| 1 | 14.4517241 |
| 2 | 24.4736214 |
| 3 | 31.9973412 |
| 4 | 25.1667843 |
| 5 | 9.22947407 |
| 6 | 10.6609602 |
| 7 | 9.69117737 |
| 8 | 10.3598309 |
| 9 | 9.25714397 |
| 10 | 11.3376131 |

B

Prediction = 10

C

| N | %P N or Fewer | %P N or more |
|---|---|---|
| 2 | 1.43 | 100.00 |
| 3 | 3.57 | 98.57 |
| 4 | 7.14 | 96.43 |
| 5 | 12.14 | 92.86 |
| 6 | 17.86 | 87.86 |
| 7 | 25.71 | 82.14 |
| 8 | 35.00 | 74.29 |
| 9 | 45.71 | 65.00 |
| 10 | 53.57 | 54.29 |
| 11 | 64.29 | 46.43 |
| 12 | 76.43 | 35.71 |
| 13 | 80.00 | 23.57 |
| 14 | 82.14 | 20.00 |
| 15 | 85.00 | 17.86 |
| 16 | 88.57 | 15.00 |
| 17 | 90.71 | 11.43 |
| 18 | 92.86 | 9.29 |
| 19 | 94.29 | 7.14 |
| 20 | 95.00 | 5.71 |
| 21 | 96.43 | 5.00 |
| 22 | 97.86 | 3.57 |
| 23 | 98.57 | 2.14 |
| 26 | 100.00 | 1.43 |

D

Fitted Line Plot
Mean of N − 6.454 + 0.2254 2MMaxS
−0.02303 2MMaxS2 + 0.000720 2MMaxS3

|          | 1     | 2     | 3     | 4     | 5     |
|----------|-------|-------|-------|-------|-------|
| Constant | 0.000 | 0.010 | 0.183 | 0.000 | 0.000 |
| HD       | 0.719 | 0.000 | 0.795 | 0.003 | 0.003 |
| HD$^2$   | 0.633 | 0.000 | 0.141 | 0.013 | 0.039 |
| CD       | 0.545 | 0.230 | 0.869 | 0.153 | 0.910 |
| CD$^2$   | 0.003 | 0.105 | 0.035 | 0.210 | 0.003 |
| R1       | 0.001 | 0.000 | 0.000 | 0.000 | 0.000 |
| R2       | 0.000 | 0.000 | 0.000 | 0.000 | 0.000 |
| R3       | 0.000 | 0.000 | 0.000 | 0.140 | 0.000 |
| S        | 0.000 | 0.083 | 0.459 | 0.000 | 0.004 |
| S$^2$    | 0.000 | 0.057 | 0.079 | 0.000 | 0.008 |
| S$^3$    | 0.003 | 0.210 | 0.000 | 0.002 | 0.075 |
| LS       | 0.000 | 0.000 | 0.000 | 0.000 | 0.000 |

ELECTRIC POWER DISTRIBUTION INTERRUPTION RISK ASSESSMENT CALCULATOR

CROSS REFERENCE TO RELATED APPLICATIONS

This application claims priority to currently U.S. Provisional Patent Application 60/913,689, filed Apr. 24, 2007, the contents of which are herein incorporated by reference.

FIELD OF INVENTION

This invention relates to the effects of the weather on electrical power distribution systems. Specifically, the risk of interruption of electrical power distribution caused by common weather conditions.

BACKGROUND OF THE INVENTION

The reliability of power distribution systems is dependent on many variables such as load capacity, customer base, maintenance, and age and type of equipment. However, the variable that is most often responsible for degraded reliability is weather, and common weather conditions are often overlooked in reliability analysis. These conditions include, but are not limited to, rain, wind, temperature, lightning, humidity, barometric pressure, snow, and ice.

Common weather does not include catastrophic events, such as hurricanes or tornadoes, which exceed reasonable design or operational limits of the electric power system. There are existing methods that define major reliability events, including catastrophic weather events and that exclude the resulting interruptions from the calculation of reliability indices.

Much of the focus of modeling the effects of weather on power distribution systems has remained on extreme weather conditions. There are also existing methods that include weather as a factor in the analysis of specific fault causes. However, methods that use the combined effects of common weather conditions to predict the total number of daily or by shift interruptions are not presently available.

There is a need for methods that can predict daily or by shift power distribution system interruptions based on common weather conditions, and for interruption risk assessment based on immediate weather conditions. A related method of normalizing reliability indices for common weather conditions is also needed to improve reliability assessments of power distribution systems.

SUMMARY OF INVENTION

Earlier work has focused on modeling the effects of extreme weather conditions on power distribution systems and on specific weather conditions causing specific faults in distribution systems. The current invention includes a method of predicting the total number interruptions in a given region caused by the combined effect of various weather conditions. Research that utilizes daily, by shift, and hourly weather data to predict the number of interruptions in a region has never been done before.

The invention includes a method of predicting the power distribution interruptions in a given region based on common weather conditions and assessing the risk of interruptions based on immediate weather conditions. Using daily and hourly weather data, the method predicts the number of daily or by shift interruptions.

The common weather conditions addressed include, but are not limited to, rain, wind, temperature, lightning, humidity, barometric pressure, snow, and ice. These conditions do not occur simultaneously at any one place, and the range of combinations is great; therefore, the invention was developed to allow broad application.

The invention also includes a method of normalizing reliability indices for common weather conditions. Power companies are constantly striving to improve their reliability performance and one method commonly used to identify changes in performance is a comparison of present performance with past performance. Such methods are often not accurate due to changing weather conditions which can skew the figures used for comparison. The present method diminishes the impact of common weather conditions and makes comparisons that allow for a more accurate determination of reliability performance.

BRIEF DESCRIPTION OF THE DRAWINGS

For a fuller understanding of the invention, reference should be made to the following detailed description, taken in connection with the accompanying drawings, in which:

FIG. 5 is a table listing, on the left side, the cumulative probability, based on the actual number of interruptions, of N or less interruptions occurring and, on the right side, the cumulative probability of N or more interruptions occurring.

FIG. 21 is a table of the overall improvement in rho for each daily measure of N, CI, and CMI.

FIG. 22 is a table of general correlation magnitude characterizations.

FIG. 24 is a partial screen shot of the 'Data' sheet of an application of the present invention in Microsoft Excel®.

DETAILED DESCRIPTION OF THE PREFERRED EMBODIMENT

Figure 1:
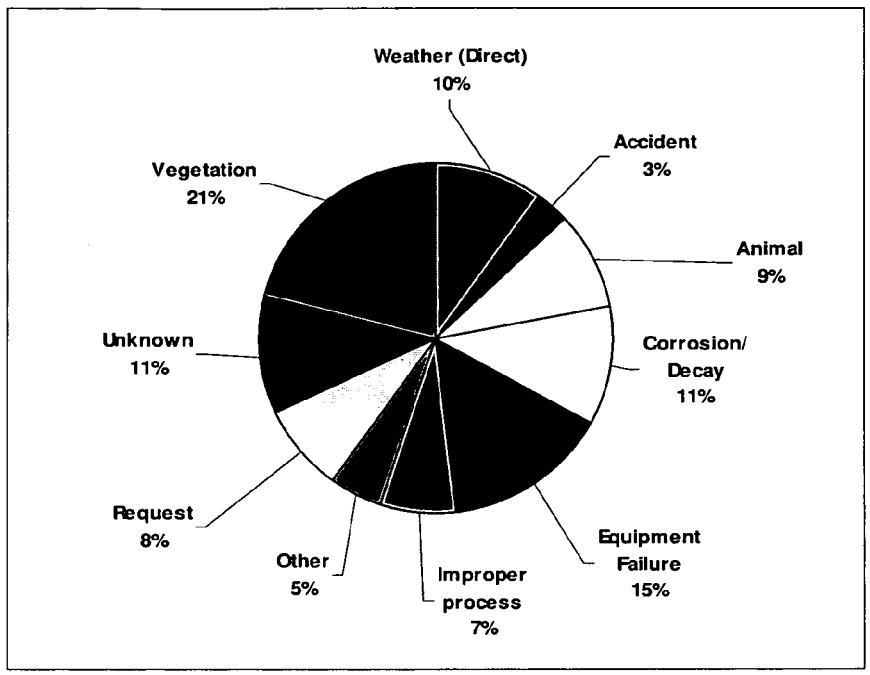
FIG. 1 is a pie chart that shows the distribution of reported causes of interruptions for the region under study during the period of study.
Figure 2:
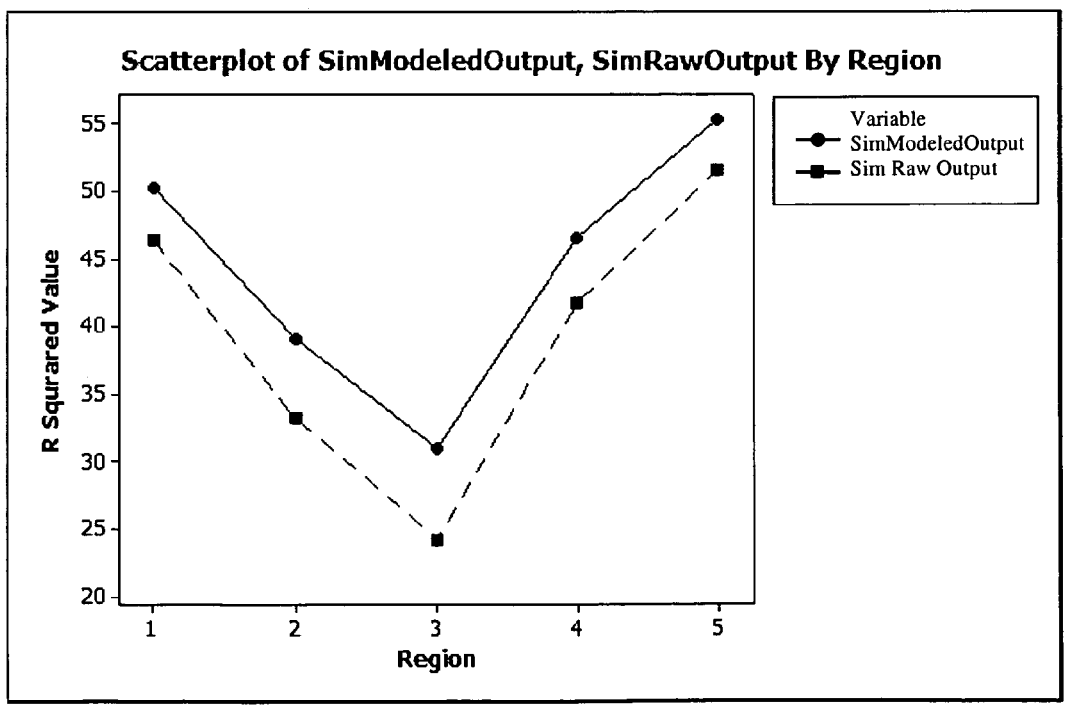
FIG. 2 is a scatter plot comparing the $R^2$ value of modeled weather data with raw weather data over five different geographical regions.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Power interruption data was provided by a utility company and weather data from the National Climatic Data Center (NCDC) was used for creation and testing of the present invention. The NCDC weather data is reported by 886 Automated Surface Observation Stations (ASOSs) located at airports around the country.

By modeling the daily common weather data received from the NCDC, the total daily number of interruptions can be consistently stochastically predicted with an $R^2$ value as high as 50% in simulations using actual interruption data as the target value (see A. Domijan, Jr., A. Islam, W. S. Wilcox, R. K. Matavalam, J. R. Diaz, L. Davis, and J. D'Agostini, "Modeling the Effect of Weather Parameters on Power Distribution Interruptions" presented at the $7^{th}$ IASTED Int. Conf. Power and Energy Systems, Clearwater Beach, Fl., USA, November 2004; which is incorporated herein by reference). This indicates weather invisibly affects other interruption causes.

Aside from the obvious culprit for interruptions, lightning and ground or line-to-line faults caused by vegetation and/or wind, the effects of common weather conditions on power reliability events has rarely been addressed. When such effects have been studied, only broad attention has been given to common weather conditions. Previous studies have been limited to a few factors such as cold temperatures, wind, or rain. Tests performed on contaminated insulators have shown the electrical characteristics of the insulators are altered when exposed to natural wetting, such as humidity or rain. Coronal effects are more pronounced with lower barometric pressure and can affect flashover rates. Other weather or environmental phenomenon may also contribute to power reliability events in ways that have not been considered.

Because the interruption data used to generate the existing methods included all interruptions described by all interruption causes for an entire day and the weather data used was daily maximums or averages collected from point sources not usually central to the area being studied, the existing methods were created based on relatively inaccurate data. The fact that the results were consistently good indicates that there is a hidden weather component in many of the interruption causes other than weather and those hidden components can be modeled more precisely by decreasing the period during which the weather data is collected from daily to hourly and by improving the location of the point weather source.

The present invention translated NCDC data and the utility company interruption data into the proper shapes and the findings to create a method of predicting the reliability of power distribution systems, including predicting the number of interruption in a system over the course of a shift or day and assessing the risk of interruption, in real-time, in a given region.

Analysis and Processing

The utility company provided reliability data for three consecutive years. The NCDC provides daily, hourly, and half-hourly weather data. The NCDC collects its data from ASOSs located at airports around the country, Weather Observation Stations (AWOSs), and smaller weather observation stations.

FIG. 1 is a pie graph of reported interruption causes. The graph shows that direct weather, such as lightning, has been determined to be the cause of 10% of the interruptions. However, the inventors have found that, by considering daily weather variables in the modeling function, the resulting forecasts of the daily number of interruptions can be stochastically predicted with an $R^2$ value in the neighborhood of 50% in simulations using actual interruption data as the target value. This indicates that there is a weather component in most, if not all, of the interruption causes illustrated in FIG. 1. Additionally, many of the interruption causes are directly affected by weather, such as vegetation growth, corrosion, equipment failure, etc. Time-series analyses have shown promise for the use of daily weather data to predict vegetation related interruptions.

The present inventions improves reliability assessments first by using hourly (or half-hourly) weather data, and reorganizing the interruption data that is reported by substations into datasets that are geographically centered on ASOSs.

The daily summary data used in developing and testing the method often created files with up to 40 columns and 14,000 rows for analysis. The inclusion of hourly reporting and the use of interruption data from additional sources increased the amount of data that required archiving and correlation tremendously. Therefore, a database was created that could manage the large amount of data. Additionally, the weather data available from the NCDC is in ASCII format and was not readily importable to the analysis software. Custom software was created to extract the daily weather information from the NCDC files and format it properly. Additional software was also created to handle the hourly and half-hourly NCDC data, the weather data provided by the utility company's weather stations, and all other required data.

Load flow prediction that involves the use of temperature and humidity to calculate the comfort zone is a mature technology that was of use in this project and these studies were not repeated. The probability of flashover due to ice buildup has been studied extensively and was also of use. However, load flow prediction does not address power reliability directly, and the studies of flashovers due to ice buildup are geographically and causally specific.

Validation of the present method was done by producing significantly accurate predictions of the number and frequency of interruptions through simulations using actual weather and interruption data. The predictions are probabilistic rather than deterministic, and provide a means of risk assessment rather than a fixed value for the number of interruptions that can be expected. This provides a real capability to determine risk. The $R^2$ value of the predictions will be a statistic of interest for daily and by shift predictions. Narrower periods include hourly risk probability assessments.

The present invention also includes methods for benchmarking the reliability of a utility's power delivery system employing the methods developed for prediction. This was done by normalizing reliability indices with respect to common weather conditions, thereby allowing a fair comparison between present and past performance of a utility, or between the performances of different utilities.

The variability of reliability (and reliability indices) from system to system or from year to year within a system due to circumstances beyond the control of the system operator is recognized as a problem that interferes with a fair assessment of a system's reliability. The development of a method for the normalization of reliability indices for weather is a recognized need. Only one known method for normalizing reliability indices for weather exists, and that method relies on a single weather variable, lightning. Although this method is well considered, its application is limited to areas where lightning is the dominant weather variable.

Simulation for Prediction

The invention was developed using three years of daily interruption and weather data. The analysis that led to the development of the methods was performed with statistical and neural network software.

Three years of daily weather and interruption data from five Management Areas (MAs) in the utility company's area of operations was compiled, for approximately 5400 exemplars. Initial analysis was done by multivariable regression, using the total number of daily interruptions as the target value and the average temperature, the total daily rainfall, the maximum two-minute sustained wind-gust speed, and the total daily number of lightning strikes as regressors. Secondary analysis was done using a backpropagation neural network with one hidden layer for function approximation. Both analyses were done using the same training data sets to develop, in the case of the multi-variable regression, a regression equation, and in the case of the neural network, a trained network. Both the regression equation and the trained network were then applied to the same sets of test data to prevent over fitting and to simulate actual application. The actual numbers of interruptions in the test data were then used as target values in single variable linear regressions with the number of interruptions predicted by the multi-variable regression equation and the trained neural network as regressors. The statistic of interest was the $R^2$ value. The trained neural network consistently returned a higher $R^2$ value, which indicated that there were hidden effects that could be accounted for by taking into account the weather data.

Methods for modeling rain, wind, and temperature were developed. These methods were based on suspected effects, such as vegetative saturation (which would weaken tree limbs) and soil saturation (which would weaken the support of root balls), and known effects, such as the third-order equation that describes the power of wind and the quadratic load/temperature curve (this curve can also be seen in interruption/temperature plots), and further analysis of the weather and interruption data. The results were that rain was categorized as a piecewise variable, wind as a cubic variable, temperature as a quadratic variable and lightning as a linear variable.

Figure 29:
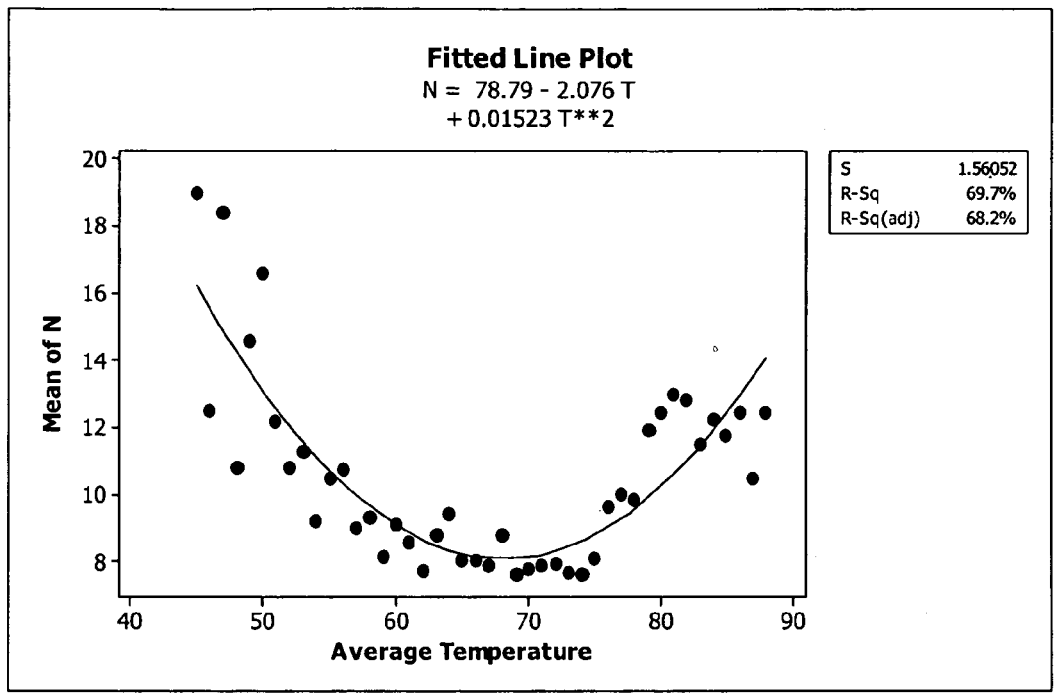
FIG. 29 is a fitted line plot of the variation of mean N verses average temperature.

The average temperature shows a quadratic relationship with the mean of the number of interruptions, N. The increase in N at low and at high temperatures can be attributed to the increase in power demand due to the heating and cooling requirements of the customers. The relationship between the average temperature and the mean of N can be expressed as a regression equation drawn from the fitted line plot of FIG. 29. The equation is $N_{avg}=78.79-2.076T+0.01523T^2$, where $N_{avg}$ is the mean number of interruptions and T is the average temperature.

The temperature at which the minimum number of interruptions occurs is found by taking the derivative of the equation and setting it equal to zero. By then solving for T, a temperature of 68.15° F. The data has integer values for temperature, so the optimal temperature (OT) was considered 68°.

Because the demand for power varies with temperature, the effect of ambient temperature movement away from the optimum temperature (OT=68) was modeled. Two parameters were defined, heating degrees (HD) and cooling degrees (CD). These parameters are available with the ASOS data; however, they are fixed with an OT of 65°, so it is desirable to recalculate using local conditions. HD is defined as the number of degrees below the OT existing on a particular day, and CD is defined as the number of degrees above the OT.

This model will also have second order terms for HD and CD, as the relationship between the average temperature and N is quadratic. The model equation for average temperature is $N=Y_1+A_1HD+A_2HD^2+A_3CD+A_4CD^2$, where $A_1, A_2, A_3$ and $A_4$ are the coefficients and are not equal to zero.

Figure 30:
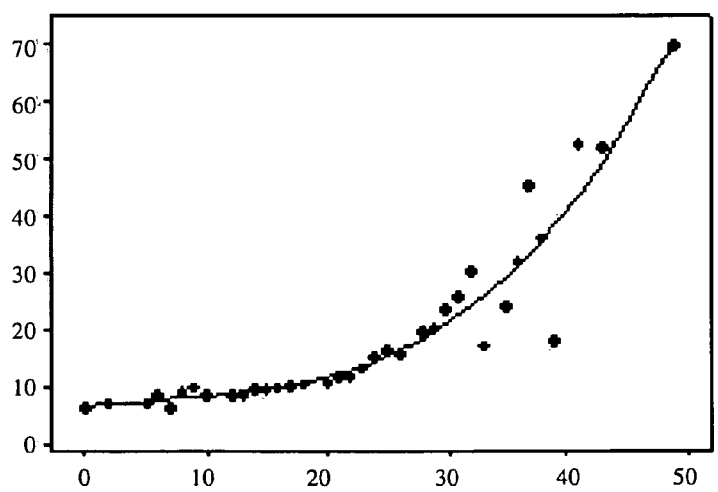
FIG. 30 is a fitted line plot of the variation of mean of N verses wind.

FIG. 1 shows the relationship between wind speed and the mean number of interruptions in the region under study for the period spanned by the data. The scattering seen above 32 miles per hour in FIG. 30 is due to the sparse data at those speeds.

The cubic relationship between wind speed and the mean number of interruptions allow for an equation for the effect of wind on total number of interruptions as $N_{avg}=Y_3+B_1S+B_2S^2+B_3S^3$, where S is the two-minute maximum sustained gust.

The effect of rain on the mean of N showed a regression distribution, which has a piece-wise relationship. This may be due to saturation effects on the vegetation. The total range of rainfall was divided into three segments: R1=0"≦Rain<1" and 0 elsewhere, R2=1"≦Rain<2" and 0 elsewhere, and R3=2"≦Rain and 0 elsewhere. The complete dataset of rain was segmented accordingly and the regression analyses was done using the following equation for rain: $N_{avg}=Y_3+C_1R1+C_2R2+C_3R3$.

Because lightning tends to occur in storm cells that may be localized and pass over a sparsely populated area, or a heavily populated one where the majority of power lines are buried, LS can have a random, though important, effect on N. Lightning also has a combined effect as it is generally accompanied by high winds and rain. Because there was no more evidence for a narrow time-frame model of the effects of lightning, it was used as a linear predictor and represented by the equation $N_{avg}=Y_4+D_1LS$, where LS is the daily total number of lightning strikes.

The equations for temperature, wind, rain, and lightening were combined to give a composite equation for the effect of weather on N: $N=Y_6+A_1HD+A_2HD^2+A_3CD+A_4CD^2+B_1S+B_2S^2+B_3S^3+C_1R1+C_2R2+C_3R3+D_1LS$. The results were then compared with the results of a combined equation for the raw weather data, $N=Y_5+A\times T+B\times R+C\times S+D\times LS$, and the results of each of the individual temperature, wind, rain, and lightening equations.

Regression analyses were performed on each of the five MAs individually using the equations for average temperature, wind speed, rain, lightening, the combined raw weather data, and the combined modeled data. Because the $R^2$ value of the regression equation, called the multiple coefficient of determination, describes the proportion of the total variation accounted for by the predictor variables, that value was chosen as the statistic of interest.

Figure 31:
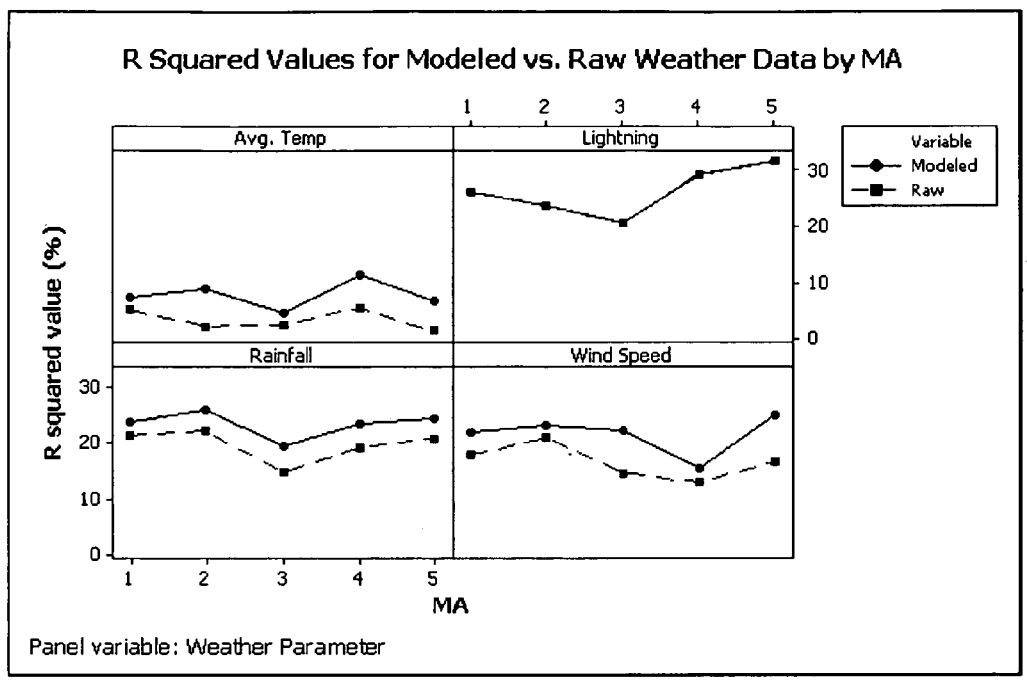
FIG. 31 is a series of four plots showing the $R^2$ values of modeled verses raw weather data by MA and by weather parameter.
Figure 32:
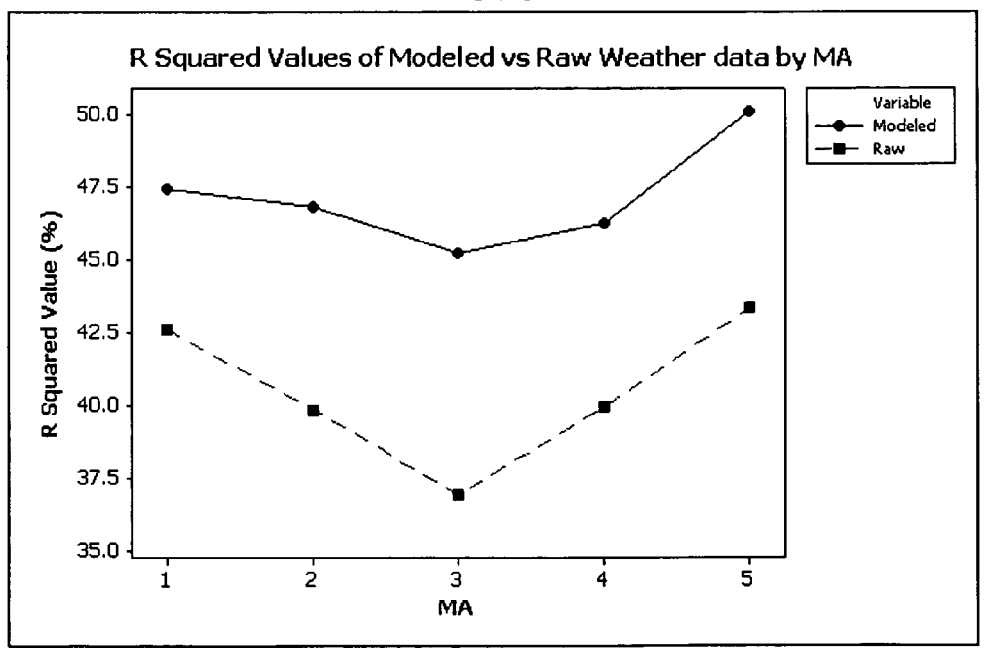
FIG. 32 is a scatter plot comparing $R^2$ values of modeled vs. raw weather data by MA.

The regression analysis on weather and N data with the raw data showed $R^2$ values ranging from 36.9% to 43.3% for different MA's. The regression analysis on weather and N data with the modeled equation showed values ranging between 45.2% and 50.1% for different MA's. Similar results occurred when applying the regression to individual weather parameters. FIGS. 31 and 32 chart the results.

To determine whether the association between the response and the predictor(s) in the equation is statistically significant, it is necessary to set an α level and compare the p-value for each predictor against the α level. The usually accepted α level is 0.050, and if the p-value is larger than this, the predictor is considered statistically insignificant. The table in FIG. 33 lists the p-values for each predictor by MA.

Figures 33, 34:
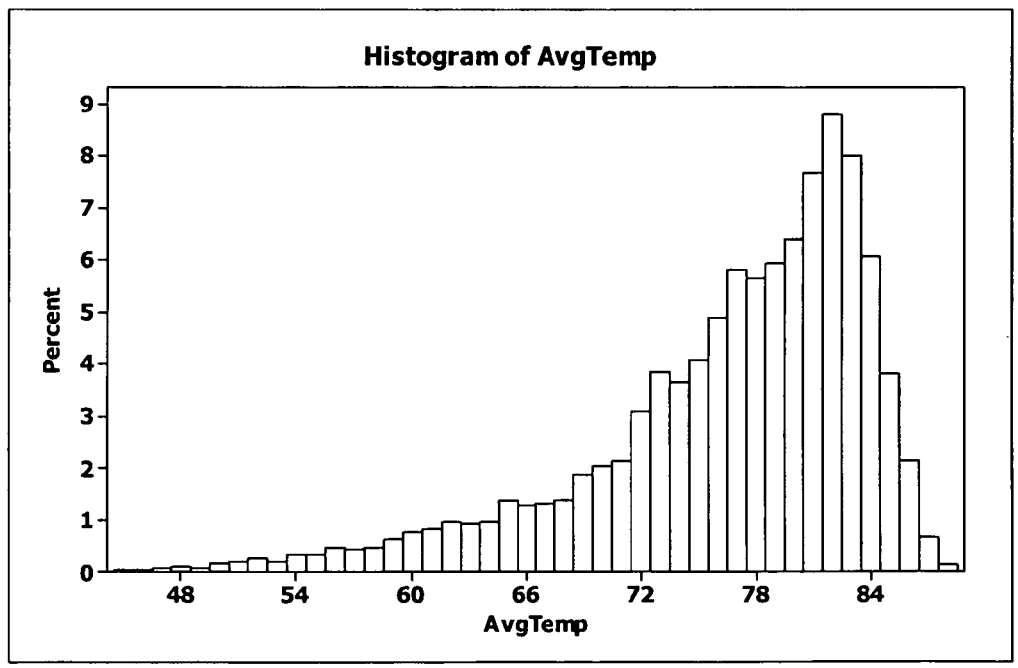
FIG. 33 is a table of ρ-values by predictor and by MA.
FIG. 34 is histogram of the percentage of occurrences of average temperatures.

FIGS. 32 and 33 show that the equations return a consistently higher $R^2$ value than equations that rely on raw weather data, and consequently, account for a larger percentage of the variance from the mean number of daily interruptions.

Although lightning seems to have a dominant role, there is no single weather parameter that is a primary cause. Since the $R^2$ value of the combined equation is not the sum of the $R^2$ values of its components, it is apparent that there are some combinatorial effects. For example, lightning rarely occurs unaccompanied by wind and rain, but high winds and rain occur often without lightning, so the role of lightning may be overstated by the fact that it has the largest $R^2$ value (FIG. 31) of the weather parameters in the model. Also, it appears from the $R^2$ values for average temperatures, that it does not play a significant role in N. However, the histogram of the temperatures of one region shown in FIG. 34 shows a relatively narrow range of commonly occurring temperatures, with 95% of the average temperatures ranging from 60 to 86 degrees, a 27-degree spread, which may not be true for other regions.

Explanations for large p-values can be either very small coefficients, or uncommon occurrences of that variable in the dataset. In addition, when variables have large p-values, their contribution to the $R^2$ value is marginal.

Although HD and $HD^2$ rates rejection as model predictors four out of ten times in the table in FIG. 33, FIG. 34 shows that there may not have been enough days below the OT to consider them significant. CD, however does not seem to be significant in any of the MAs. This may be due to the dominance of the second order $CD^2$ term in the heavily skewed FIG. 34. The two times that $CD^2$ is rejected, neither HD or $HD^2$ is rejected, lending support to the belief that the actual distribution of heating and cooling days among the MAs is quite different than FIG. 34 suggests.

Regardless of the possible combinatorial effects of the weather parameters, or the occasionally large p-values, the consistent improvement of the $R^2$ values, whether in isolation or in combination, in the modeled equations shows that the method is valid.

The inclusion of barometric pressure as a weather variable and recent daily interruption data as a system variable that reflects the weather trend increased the simulated $R^2$ values to an average of 50%. However, despite repeated simulations involving data sets from 14 different regions within the utility company's area of operation, and multiple year sets, the $R^2$ value ceased improving beyond 50% (average) except in occasional instances, indicating that additional variables and more precise data was needed.

Figure 3:
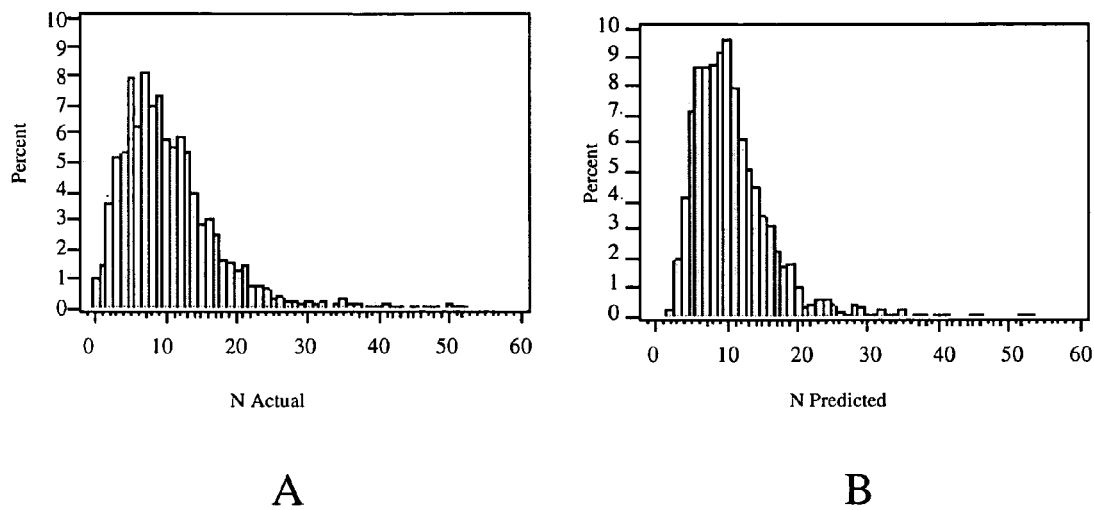
FIG. 3A is a set of histograms representing the actual number of interruptions for 1,458 days combined from several adjacent Management Areas (MAs) of the utility company.
FIG. 3b is a histogram representing the predicted number of interruptions for 1,458 days combined from several adjacent Management Areas (MAs) of the utility company.

One consistency throughout all of the simulations can be seen in the histograms of FIG. 3. FIG. 3A is a histogram actual number of daily interruptions and FIG. 3B is a histogram of the predicted number of daily interruptions. The histograms of FIG. 3 represent the predicted and actual number of interruptions for 1,458 days combined from several adjacent MAs within the utility company's area of operation. It can be seen that, although the distribution is similar, the number of lower valued predictions is much less than the number of actual lower values. This has occurred in all of the simulations. It becomes less pronounced the larger the data set becomes, as in this case, and simulations with smaller data sets will not usually predict values below five interruptions. This indicated that the model was incomplete. Either there were variables missing from the overall model that would have a negative impact on the predictions, or one or more single variable models need to be reconsidered, or both. However, the $R^2$ value for this particular simulation was 61.3%. This was much better than usual and it has been seen that increasing the size of the data set has a positive effect on the accuracy of the predictions.

Figure 4:
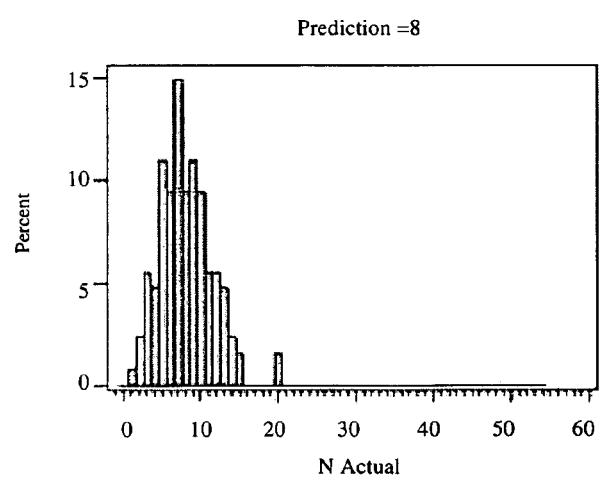
FIG. 4 is a histogram of the actual number (as a percentage) of interruptions, N, that occurred for the days when the prediction given by the present method was eight interruptions.
Figure 6:
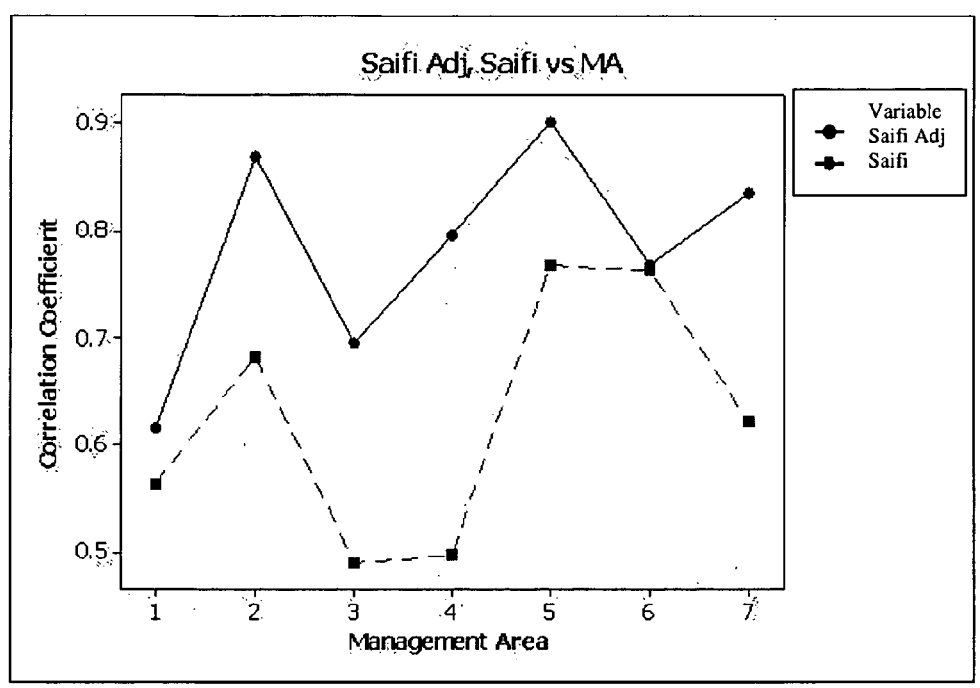
FIG. 6 is a scatter plot of a simulation performed with historical data comparing the correlation coefficient of the monthly SAIFI (System Average Interruption Frequency Index) and the normalized (or adjusted) SAIFI of seven different MAs.

The histogram of FIG. 4 and the table of FIG. 5 were created with neural network function approximation using the same data as was used for FIG. 3 and show the probabilistic risk assessment for a prediction of eight interruptions. The histogram in FIG. 4 shows the actual number (as a percentage) of interruptions that occurred during this simulation for the days when the prediction was eight interruptions. The left side of the table of FIG. 5 lists the cumulative probability, based on the actual number of interruptions, of up to N interruptions occurring. From the table, it can be seen that, for this region, if the prediction was eight interruptions, there is a 90% confidence level that the actual number of interruptions will not be greater than 12.

Expansion of these analyses to include hourly weather and interruption data provide information on weather variables that are not available in daily summaries such as humidity, dew point, and rain rate. As the time frame for which the modeling is performed narrows, the range over which the probability assessments shown in the table of FIG. 5 will also narrow. Additionally, real-time interruption risk assessments can be implemented based on immediate weather conditions.

Normalization of Reliability Indices

Power companies are constantly striving to improve their reliability performance, and one of the methods they use to identify changes in performance level is comparison of present performance with past performance. Because of seasonal changes in the weather, these comparisons are often made between the present month and the same month in the previous year. However, because of weather patterns that can shift from year to year, it is difficult to separate the baseline performance from the overall performance. A method of normalizing reliability indices was needed so that engineers can evaluate a system's performance without guessing at the usually highly significant role of weather conditions.

There is already a method in place in Florida, where the power system under study is located, to adjust reliability indices for extreme, or catastrophic, events. The present method excludes this type of weather. The Florida Public Service Commission (PSC) allows the exclusion of certain interruptions from the calculation of reliability indices including, those "directly caused by . . . planned interruptions, a storm named by the National Hurricane Center, a tornado recorded by the National Weather Service, ice on lines, a planned load management event, an electric generation disturbance, an electric transmission system disturbance, or an extreme weather or fire event causing activation of the county emergency operation center". Interruptions not included in the above definition can be excluded by petition.

Another method of normalizing reliability indices has been suggested that is based on the fact that in Florida, lightning plays a key role in the increase in the number of interruptions (N), and subsequent increase in other reliability indices.

However, prior to the present method, there were no methods described that would allow a utility to normalize their reliability indices for the effects of common weather conditions that include rain and wind. Such a method would be useful in areas where lightning does not play as significant a role and during times of the year when lightning is not as common.

In addition, modeling of the effects of wind, rain, temperature, and lightning on the number of daily interruptions has shown that rain and wind will also contribute significantly to degraded reliability.

Figure 7:
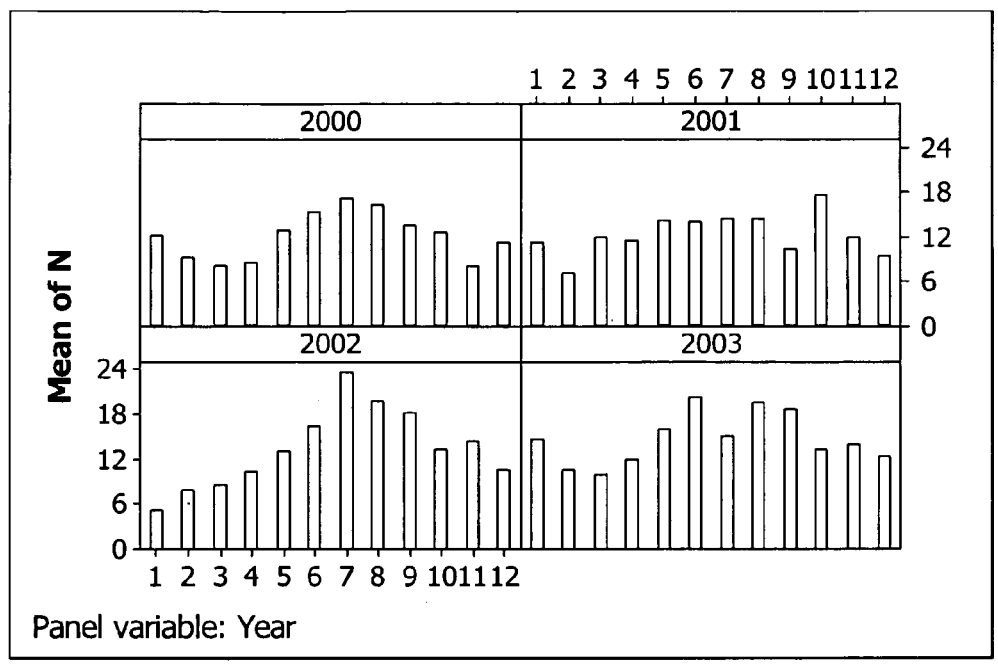
FIG. 7 is a series of four graphs showing the mean number of daily interruptions (N) by month for the years 2000, 2001, 2002, and 2003.
Figure 8:
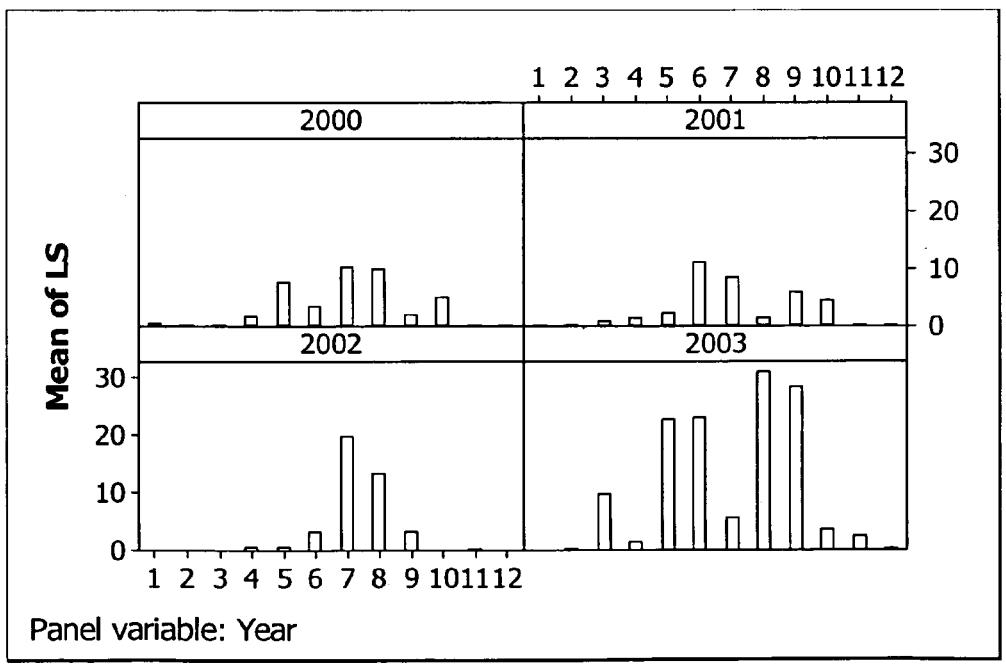
FIG. 8 is a series of four graphs showing the mean number of daily lightning strikes (LS) by month for the years 2000, 2001, 2002, and 2003.
Figure 9:
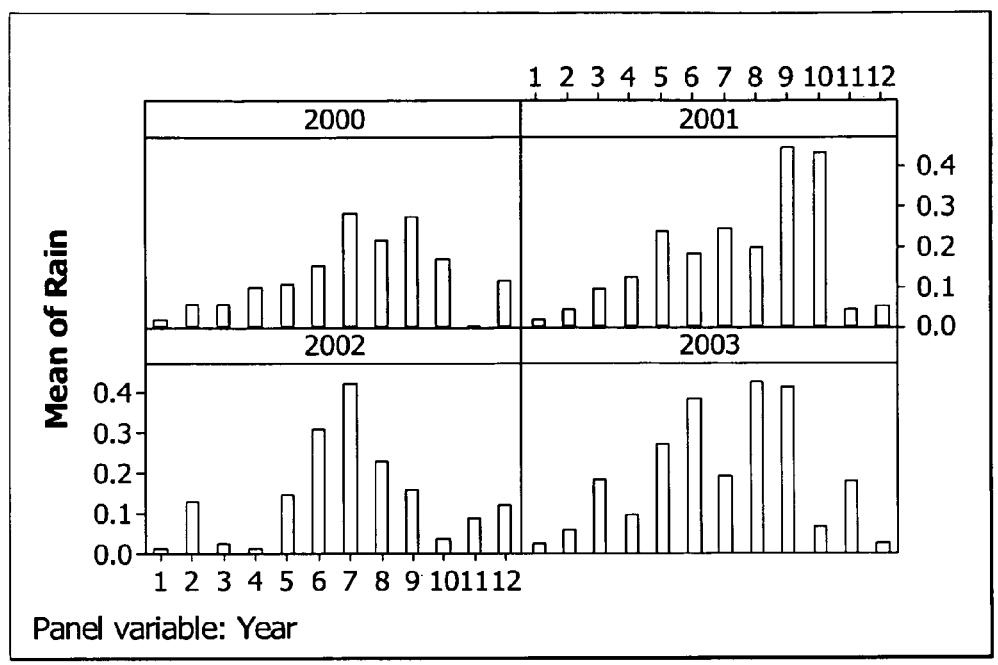
FIG. 9 is a series of four graphs showing the mean amount of daily rain by month for the years 2000, 2001, 2002, and 2003.

FIGS. 7 through 9 are bar graphs displaying the mean values of the daily number of interruptions (N), the total daily rainfall (Rain), and the number of lightning strikes (LS) by month and year for one of the MAs of interest. These figures show that there is a recognizable general pattern of a summer peak in interruptions with a winter falloff, but that it varies from year to year in its specifics. Sometimes the cause of that variation in N can be seen in the weather charts, such as the 2003 N pattern in months 4 through 9 coinciding with the 2003 pattern of LS, or the 2001 N pattern in months 5 through 10 corresponding to the 2001 pattern in the Rain figures.

However, these patterns are difficult to see, open to debate, and provide little useful information. Further, there are other spikes in the figure whose cause cannot be determined by averages, but may still be due to a single unseasonable event. The one conclusion that can be drawn from these figures is that reliability indices are subject to shifting seasonal weather variations. Because of the year-to-year variations in monthly averages, reliability reports that do not adjust for variations in seasonal weather patterns would be likely to result in misleading conclusions.

The present method finds statistical outliers in both common weather and interruption data, and uses those outliers to identify days where common weather conditions interfere with the evaluation of the baseline performance. The reliability indices are then adjusted for use during comparative studies.

Because it is equally likely that the present year could have milder weather and consequently fewer interruptions, this method provides a bilateral analysis with the result that the monthly interruption count, and the associated measures and indices, are as likely to be adjusted up as down.

This method will allow reliability engineers to focus on other reasons for any shift, up or down, in the reliability indices without the guesswork involved in evaluating the effects of weather.

The method assumes that, barring any unusual differences in the operational or environmental conditions that a system experiences, the daily reliability measures should have a high correlation from year to year. Although there are many reasons that the daily measures may not correlate well from year to year, such as improved maintenance, increased undergrounding of overhead conductors, and replacement of equipment reaching the end of its service life, weather is certainly a significant factor.

The method also assumes that by accounting for variances, including those caused by the above factors, will increase the correlation.

It is contended that, no matter where in the range the unadjusted correlation lies, if the present method consistently and positively improves that correlation by adjusting the N, the customers interrupted (CI), and the customer minutes interrupted (CMI) counts, then some portion of the effects of common weather will be accounted for. The interpretation of a zero correlation improvement would be that weather patterns did not change.

The statistic of interest for the evaluation of the normalization method is the Pearson correlation coefficient (rho) as given by $$\rho = \frac{\sum_{i=1}^{n}(X-\overline{X})(Y-\overline{Y})}{(n-1)s_x s_y}$$

where: $\overline{X}$=sample mean for the first variable, $s_x$=standard deviation for the first variable, $\overline{Y}$=sample mean for the second variable, $s_y$=standard deviation for the second variable, and n=number of paired data points. The correlation coefficient measures the strength of the linear relationship between two data sets, has a range of −1 to 1 and is neutral to the means of the variables being correlated.

Another statistic that is often reported for correlations is the p-value. The p-value is a measure of the strength of the correlation; however, confidence intervals have been reported instead as they provide a measure of the accuracy of the correlation as well as the strength. The confidence intervals for the correlations were calculated by first using the Fisher z-transform. The transformed correlation (z) is a standard normal distribution, given by $$z = 0.5\ln\left[\frac{(1+\rho)}{(1-\rho)}\right].$$

The confidence limits of z are found by applying the inverse standard normal distribution function, which does not have a closed form and must be computed numerically:

$$\pm z' = z \pm \frac{NORMSINV\left(\frac{100 - \% \text{ confidence}}{200}\right)}{\sqrt{n-3}}.$$

The confidence limits for z (±z') are then transformed back to confidence limits for ρ as shown by $$\pm \rho_{CL} = \left[\frac{(e^{2\pm z'} - 1)}{(e^{2\pm z'} + 1)}\right].$$

Figure 10:
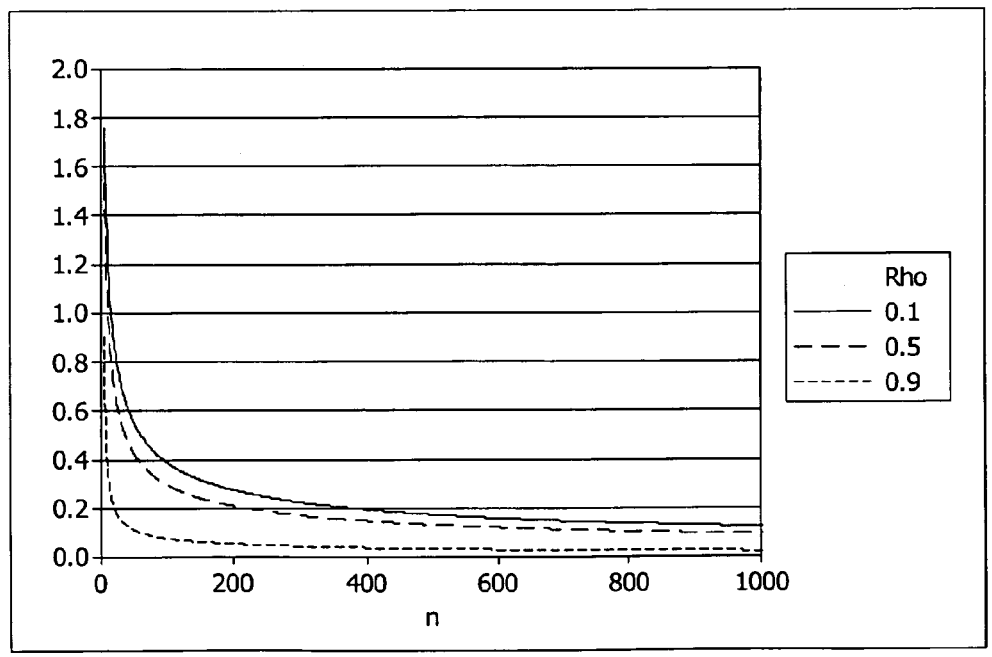
FIG. 10 is a graph of the confidence intervals as a function of n and ρ.

FIG. 10 shows a family of curves for the confidence intervals for n paired data points between 5 and 1500 with a ρ of 0.1, 0.5 and 0.9. It is apparent from FIG. 10 that the confidence intervals are inversely, though non-linearly, proportional to both the number of paired data points and the magnitude of the correlation.

As is shown in FIGS. 7 through 9, there are seasonal weather patterns that can be seen in the monthly averages, and since this method is intended to find outliers in common weather conditions, comparisons must be made between relatively small samples. Outliers found using an entire year's data would represent extreme weather conditions and would be clustered in the summer and fall months offering little or no opportunity to normalize reliability indices year-round. Monthly sampling was chosen because it is a period of time often chosen for comparative reliability studies and it is a small enough sample to capture outliers that would otherwise be lost to view.

However, in Florida there are occasionally months where the number of days reporting non-exclusionary interruptions is much less than 30. August and September of 2004 are such months with reporting of less than eight days each month due to back-to-back hurricanes. These months were not included in the analysis. Therefore, the total number of months normalized from 2001 through 2004 is 46. For these reasons, monthly sampling provides the most accurate comparison of one year's common weather conditions to another year's common weather conditions.

Five years of daily summary ASOS data (2000-2004) was collected from the NCDC for weather stations located within or near nine MAs in the utility company's area of operations. The value for wind was chosen to be the two-minute maximum sustained gust (2MMaxS) and for Rain was the total daily accumulation.

The utility company provided interruption and lightening strike data from their records for the MAs of interest. Because this method is designed to normalize reliability indices for common weather conditions, the interruption data was segmented to exclude interruptions that were either administrative in nature (tickets written in error, no loss of service (NLS), etc) or that were deemed exclusionary by the PSC. Further, many of these exclusionary interruptions were due to extreme weather conditions, such as hurricanes, that required the exclusion of the entire day's interruptions. In the latter case, the weather data for that day in that MA was also excluded from the calculation of the weather outlier limits.

The normalization method, in its basic form, involves weather and interruption data from two different years, a target year and a baseline year. The target year is the year to be adjusted, or normalized, and the baseline year is used as a reference year, providing the outlier thresholds to which the target year's weather is compared.

Weather outliers are those days in the target year that had weather values above the reference year's outlier thresholds. The daily values of four variables, interruptions, wind speed, rain, and lighting strikes, were compared to determine the outlier thresholds for each. The shapes of the data sets and the distributions they most closely resemble, as described below, provide the rationale for the choice of thresholds beyond which a data point was determined to be an outlier. Histograms and probability plots of the actual data, as shown in FIGS. 11 through 19, show the fit of the data to the distribution chosen to model it. FIGS. 11 through 19 are representative of all the ASOSs and MAs. The thresholds for each were determined as follows:

1) Interruptions (N): It is well known that interruption data (N) follows the lognormal probability distribution and this was verified using probability plots of the utility company data. The data must first be transformed by taking its natural log. The transformed data will follow a normal distribution, so to determine the threshold above which the target data will be compared to the weather outliers, at the mean plus some number of standard deviations of the transformed target data, the following equation was used: Threshold=α+Aβ, where α is the mean of the transformed target data, β is the standard deviation of the transformed target data, and A is the number of standard deviations sought. This transformation and the associated threshold calculations are performed on the target data.

Figure 11:
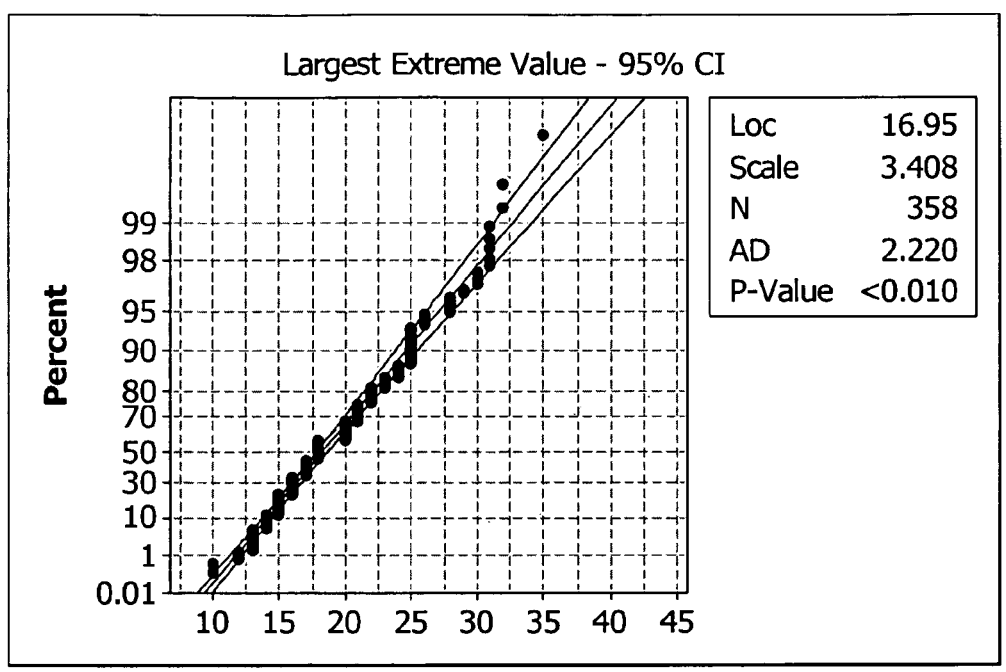
FIG. 11 is a probability plot modeling the Largest Extreme Value, or Gumbel (maximum case) probability distribution, of the wind data (2 MMaxS).

2) Wind Speed (2 MMaxS): The wind data defined by the 2 MMaxS is most closely modeled by the Largest Extreme Value, or the Gumbel (maximum case) probability distribution. A probability plot of the 2 MMaxS data is shown in FIG. 11. It should be noted that the 2 MMaxS data is limited to integer values, and so cannot be made to fit as well as a randomly generated Gumbel distribution, although the fit is quite good for a naturally occurring data set as can be seen by the Anderson-Darling value of 2.22.

To determine the outlier threshold, the location and scale parameters of the 2 MMaxS data, μ and β respectively, must first be estimated from the reference data. The equations for estimating these parameters are as follows:

$$\mu = \overline{X} - 0.5572\beta \text{ and } \beta = \frac{s\sqrt{6}}{\pi},$$

where $\overline{X}$ and s are the sample mean and standard deviation of the reference data respectively.

For this distribution, unlike the normal or lognormal distributions, there is a closed form percent point function. The percent point function is the inverse of the cumulative probability function in that it calculates the probability that a member of the data set is greater than or equal to x for a given x. The percent point function is given as $$G(p) = -Ln\left(Ln\left(\frac{1}{p}\right)\right),$$

where p is the percentage under the curve expressed as a fraction of one. A 0.9 percentage, meaning that 90% of the data will be under the curve at that percent point, can be calculated as a 2.25037 percent point (G (p)). This is a fixed value, independent of the location and scale parameters.

To apply this function to the target data, the target data must first be standardized using the location and scale parameters, µ and β, of the reference data. However, it is not necessary to transform the reference data merely to calculate the location and scale parameters of the reference data. Then the location and scale parameters of the reference data can be used to standardize the target data using the following equation:

$$G(x) = \frac{(x - \mu)}{\beta}.$$

Following this standardization, approximately the top 10% of the data, depending on fit, will be greater than or equal to 2.25037.

Figure 12:
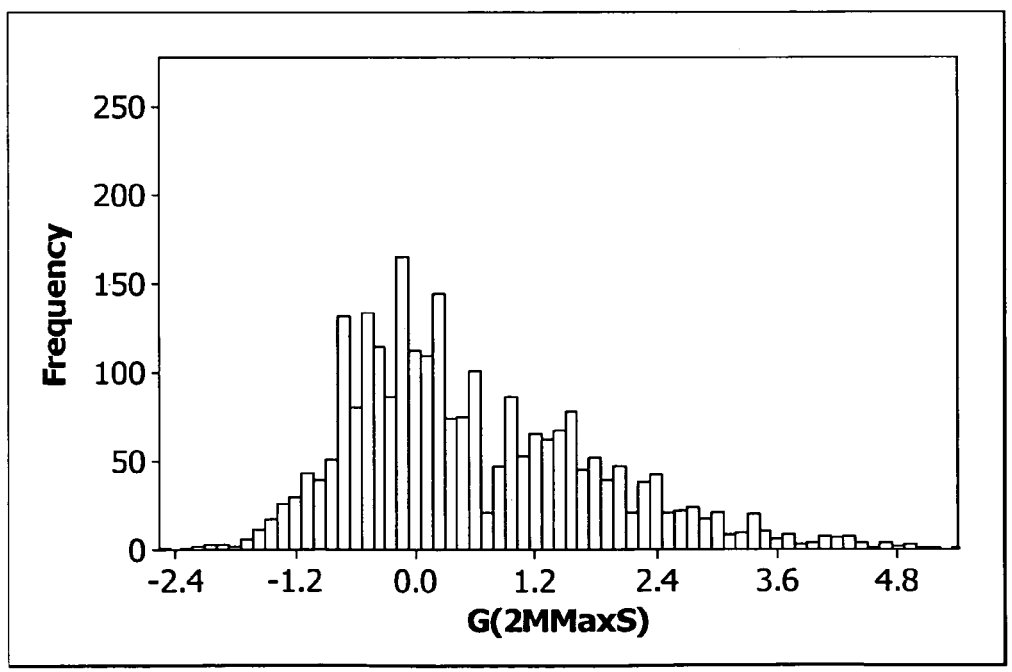
FIG. 12 is a histogram of raw 2003 wind data (2 MMaxS).
Figure 13:
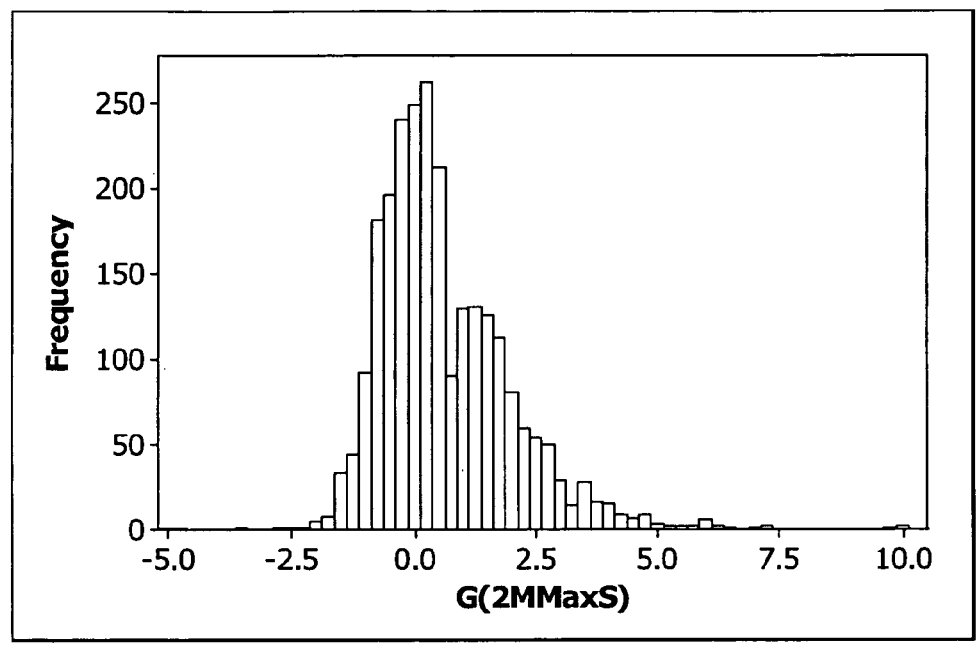
FIG. 13 is a histogram of 2003 wind data (2 MMaxS) standardized with 2002 location and scale factors.

By using the location and scale parameters of the reference data to standardize the target data, shifts in the range of values, such as these that may occur due to annual variations in weather patterns, will be transferred to the standardized data. Then the outlier threshold will be 2.25037. FIGS. 12 and 13 illustrate how the data will shift using the prior year's parameters. Although this seems slightly more complicated than the lognormal transformation, it is actually simpler because the percent point function is in closed form, and the outlier threshold is fixed.

Figure 14:
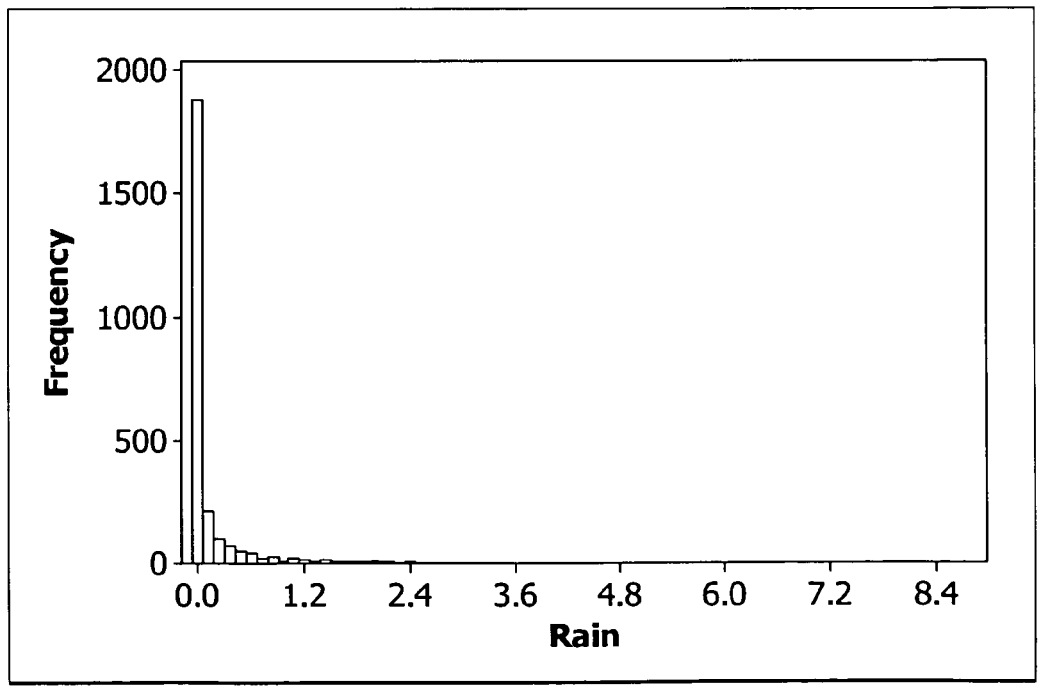
FIG. 14 is a histogram of the rain data.
Figure 15:
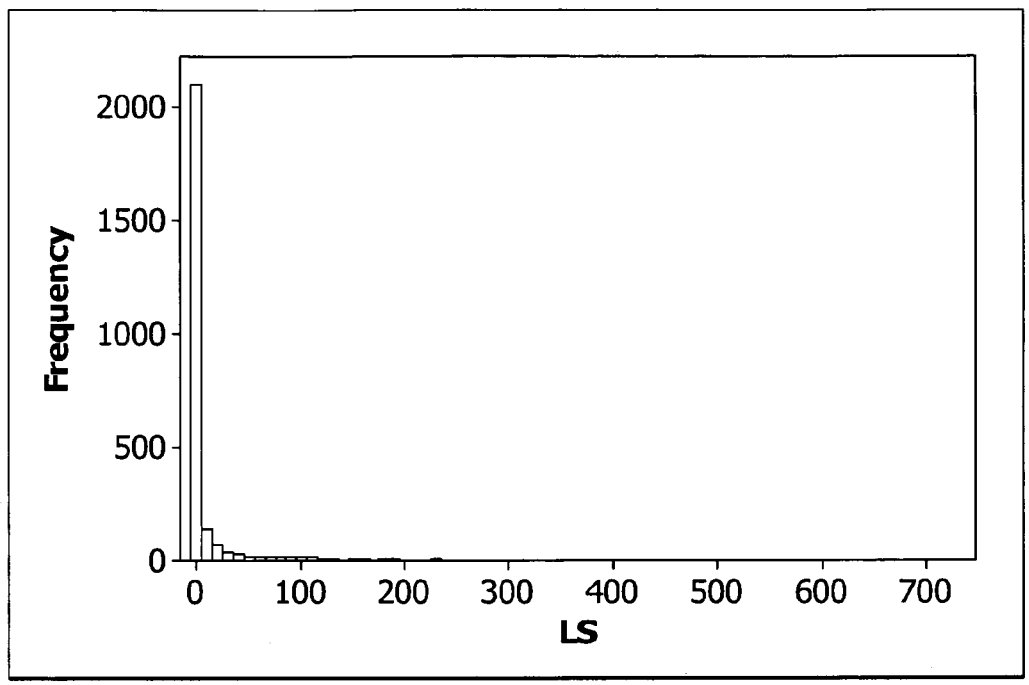
FIG. 15 is a histogram of the lightning strikes (LS).

3) & 4) Rain and Lightning Strikes (LS): The Rain and lightning strike data did not fit any of the standard distributions because a large percentage of the data was zeros. The remainder of the data had, as a general characteristic, a heavy grouping of data points at the lower values with individual extreme values spread across a large range. FIGS. 14 and 15 show the shape of the data. Because of the large Y scale, there are many individual data points on the X scale that cannot be shown, but an idea of the shape of the data can be developed by observing that the X scale is limited by the largest value in the datasets.

Because of the fact that no distribution could be found to fit the data, Tchebysheff's Theorem was used to estimate the outlier limits. Tchebysheff's Theorem states that for a certain number, K, of standard deviations, a certain minimum percentage of data points will always fall within plus or minus the mean plus K standard deviations regardless of the distribution. The following equation gives that percentage and can be solved for any number K, with K not limited to integer values:

$$\text{Percentage} = \left(1 - \frac{1}{K^2}\right).$$

Although this equation defines the maximum number of standard deviations required for a specific percentage of the data to be under the curve, the actual number of standard deviations must be determined empirically.

The choice of outlier thresholds for the variables in this method cannot be determined definitively, but must be approached heuristically. A theoretical basis combined with an empirical application provided the choices with the optimal results.

An outlier threshold that is generally accepted is the mean plus three standard deviations of a normal distribution which puts approximately 99.77% of normally distributed data under the curve. This provided a basis for the choices for the thresholds for the Rain and LS reference data. The Rain and LS distributions, FIGS. 14 and 15, respectively, suggest that even at that level, the most damaging days will still be captured. Additionally, there are many months with very little or no Rain or LS, in which case the location and scale factors applied to the target data would be zero and zero, effectively making any day with Rain and/or LS an outlier. Direct experimentation showed that the optimal thresholds were nearly the same as the normal mean plus three standard deviations.

Wind has a cubic relationship with the number of interruptions and after approximately a 25 mph 2 MMaxS the effect is increasingly magnified (see A. Domijan, Jr., R. K. Matavalam, A. Montenegro, W. S. Wilson, J. R. Wilson, L. Davis, J. D'Agostini, "Analysis of Rain, Wind, and Temperature Effects on Power Distribution Interruptions", Int. Journal of Power and Energy Systems, Vol. 24/2, pp 51-57, 2004; which is incorporated herein by reference). The use of the 99.77% standard for a 2 MMaxS outlier would set the threshold at over 35 mph, effectively eliminating many possibly extremely damaging wind values. Further, the weather data is taken at a point source and the interruption data is taken from an area source. As such, the 2 MMaxS was considered an indicator of the wind conditions for that day rather than a definitive value. The threshold was chosen so that lower values could be captured.

The threshold for the interruption data was chosen to be the mean plus 0.8 standard deviations of the log transformed target data. Since the location and scale factors of the N data apply to the target data, it was determined that the upper 20% of the N data should be available for comparison with the weather outliers that are defined by the location and scale factors of the reference data. The purpose of this is to allow for those days that have a high number of interruptions whose causes are not related to the weather. Further, a high threshold would limit the effectiveness of the method by denying the ability to cross-correct (when several days in the same month have both positive and negative adjustments, thereby canceling).

Figures 19, 20:
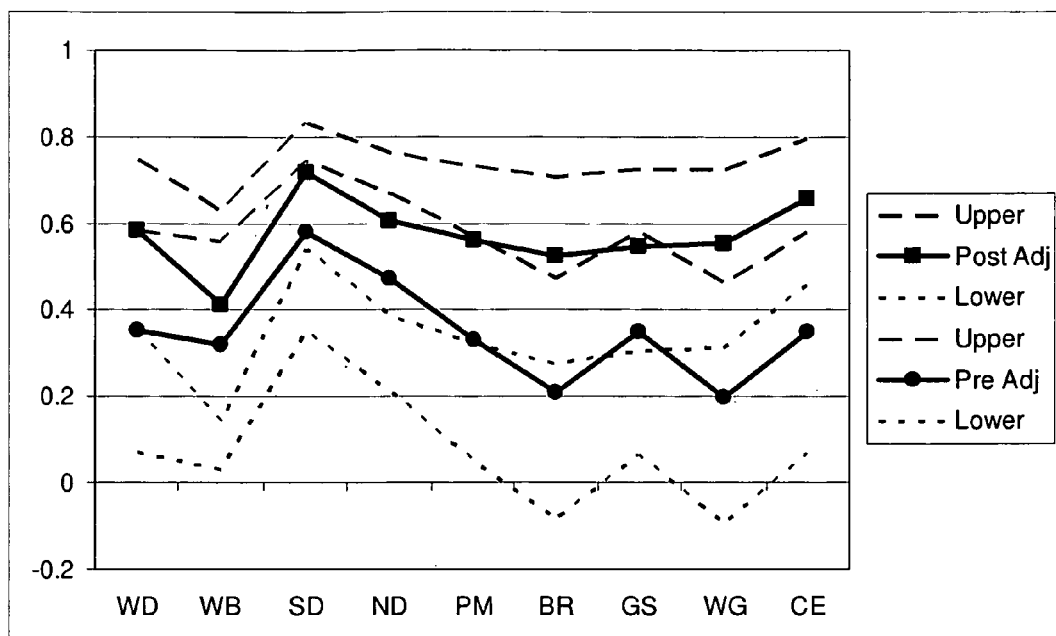
FIG. 19 is a graph of pre- and post-adjustment ρ by MA for SAIFI for 46 months with 95% Confidence Intervals.
FIG. 20 is a table of the location and scale factors (or percent point) chosen and the percent of the data that is under the curve when the location and scale factors are applied to the data from which they are derived.

The table in FIG. 20 shows the location and scale factors (or percent point) chosen and the percent of the data that is under the curve when the location and scale factors are applied to the data from which they are derived.

Once the outlier thresholds are determined, the weather outliers and interruption outliers are determined. Weather outliers are those days in the target year that have weather data values above the reference year's weather outlier threshold. Interruption outliers are those days in the target year that have interruption data values above the reference year's interruption outlier threshold. When a weather outlier occurs on the same day as an interruption outlier, that day is called an outlier intersection. A hyper-geometric probability distribution is then used to determine, with a 95% confidence level, whether the weather and interruption outliers of the outlier intersections are related or intersected randomly. If the outliers are related, those interruptions are removed from the target year's calculation of reliability indices. This procedure is then reversed, using the target year's data to set the threshold for the reference year's data. If an intersection is related in the reversed procedure, the interruptions from the reference year are added to the calculation of the target year's indices.

In this manner a bilateral analysis was achieved that allowed for the possibility that the target year's weather was much milder than the reference year's weather and that the number of interruption in the target year would subsequently have to be increased in order to perform a comparative reliability study that was not skewed by variable weather patterns.

To validate the normalization method, five years (2000-2004) of both interruption and weather data were collected with the first year to have its measures adjusted being 2001. For the four years when measures were adjusted (2001-2004) there were approximately 1,350 (allowing for missing data) paired data points available for correlation in each MA for each measure.

Figure 16:
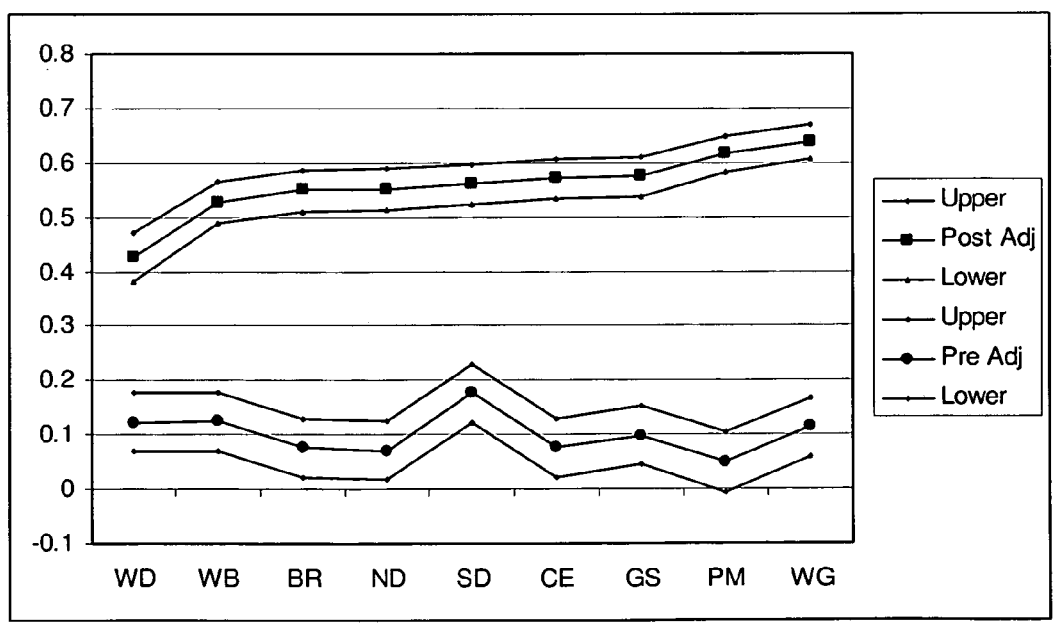
FIG. 16 is a graph of the pre- and post-adjustment ρ by MA for four years daily N with 95% Confidence Intervals.
Figure 17:
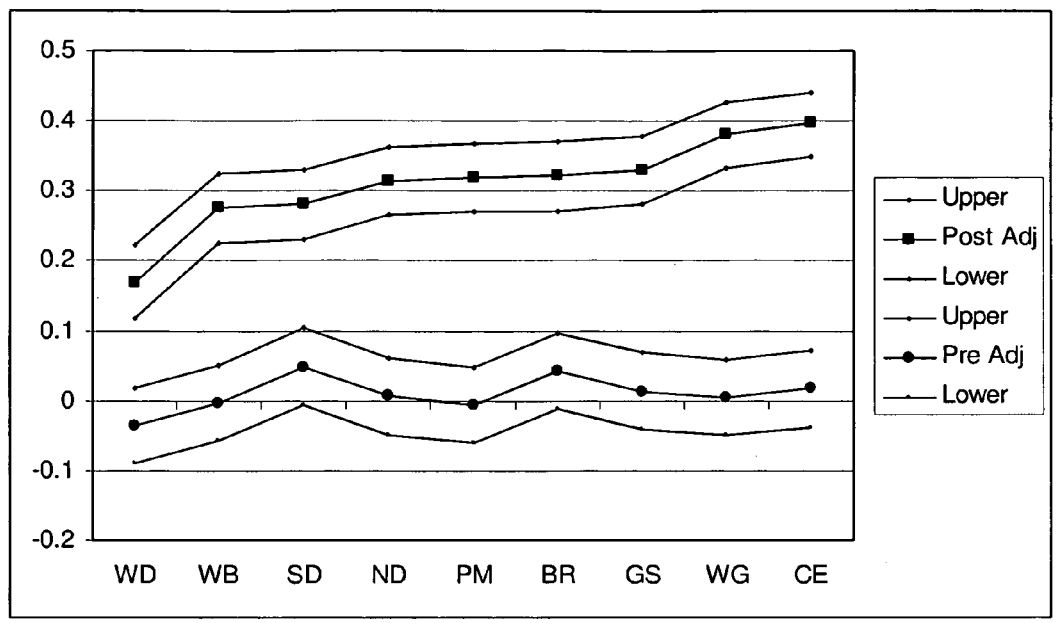
FIG. 17 is a graph of the pre- and post-adjustment ρ by MA for four years daily CI with 95% Confidence Intervals.
Figure 18:
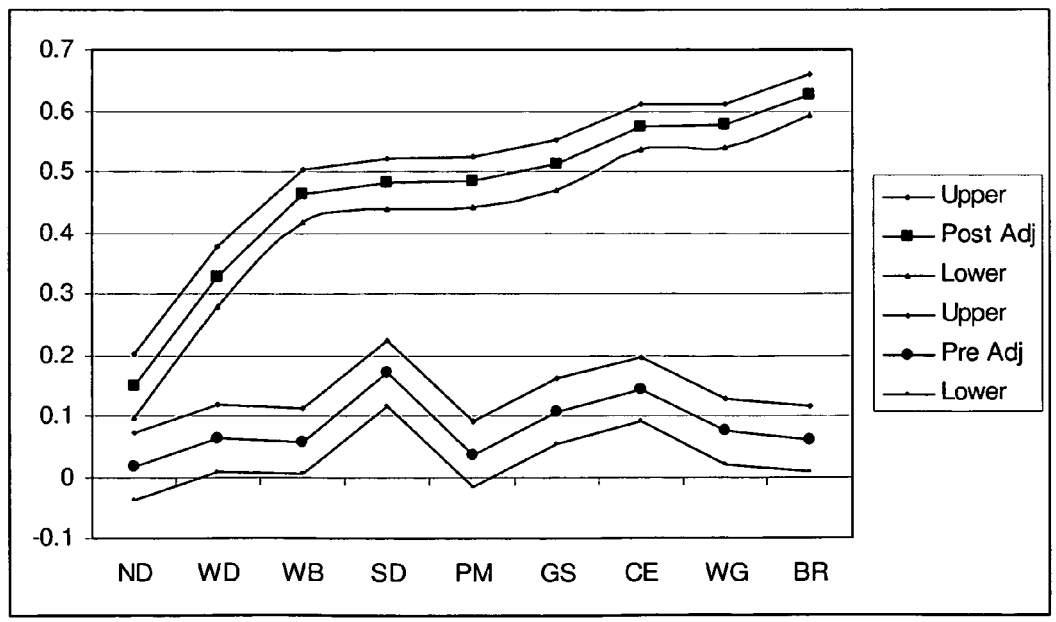
FIG. 18 is a graph of pre- and post-adjustment ρ by MA for four years daily CMI with 95% Confidence Intervals.

FIGS. 16 through 18 and the table in FIG. 21 show the correlation improvements for each daily measure. For maximum clarity, the data has been sorted from the lowest post-adjustment p value to the highest. It can be seen from FIGS. 16 through 18 and the table in FIG. 21 that in each case, the adjustments performed by the proposed method resulted in a medium to strong improvements in the linear relationship between the two years' daily measures. It can also be seen that for most of the trials, there was little, no or negative linear relationship between the two years for CI and CMI.

A discussion of correlation coefficients requires some way to characterize their absolute, or in the case of comparisons, relative magnitudes. A general rule of thumb for magnitude characterizations is shown in the table of FIG. 22. It can be seen by applying these characterizations to the correlation improvements shown in FIGS. 16 through 18 and the table in FIG. 22 that the improvements in the adjusted measures range from small to large with a moderate average. It can also be seen that the correlations of the unadjusted measures is small or, for the most part, clinically trivial.

It is reasonable then to assume that the use of the adjusted measures to calculate the reliability indices N, SAIFI, SAIDI, and CAIDI should result in a stronger linear relationship between one year's reliability indices and the next. However, because the reliability indices are calculated monthly the number of months in this dataset for each MA is only 46, and referring back to FIG. 10, it can be seen that for moderate to large (using the $\rho=0.5$ curve) correlations the number of paired data points needed to attain a confidence interval of 0.10 is approximately 850, and confidence intervals for an n of 46 would be approximately 0.45 for the adjusted indices and 0.55 for the unadjusted indices. FIG. 19 shows the correlations and confidence intervals for Monthly SAIFI.

It can be seen that, although there is a consistent improvement in $\rho$, such large confidence intervals overlap not only each other, but the correlations themselves, so that the correlations cannot be used for comparison.

As n goes down, the confidence intervals increase rapidly, so this type of analysis can produce erroneous results if performed with a smaller n than is required to attain confidence intervals that do not overlap.

The limitations of this method are created by the bilateral nature of the analysis and by the data required. Because this method compares one year to another by finding outliers in the monthly data, averaging of many years' weather and interruption data would obscure the very outliers that this method depends on, so comparison to a multi-year average could not be done by averaging the raw data. In addition, a multi-year analysis of reliability trending could not be done because each year is normalized to only the previous year's raw data rather than its normalized data. However, both of these types of analysis can be done by establishing a baseline year for normalization and averaging or trending the following years' normalized reliability indices. Unfortunately, not every locale will have an available weather station and only the ASOSs have the range of data used in this analysis. However, this limitation can be overcome by installing dedicated weather stations in the area of interest.

Practical Application of the Theoretical Models

To put methods discussed above to work, a customized software program was created. The function of the program is demonstrated using the Microsoft Excel® spreadsheets shown in FIGS. 23 through 28. The program utilizes six sheets, each labeled according to its function: Introduction, Input, Output, Storage, Comparison, and Data.

Figure 23:
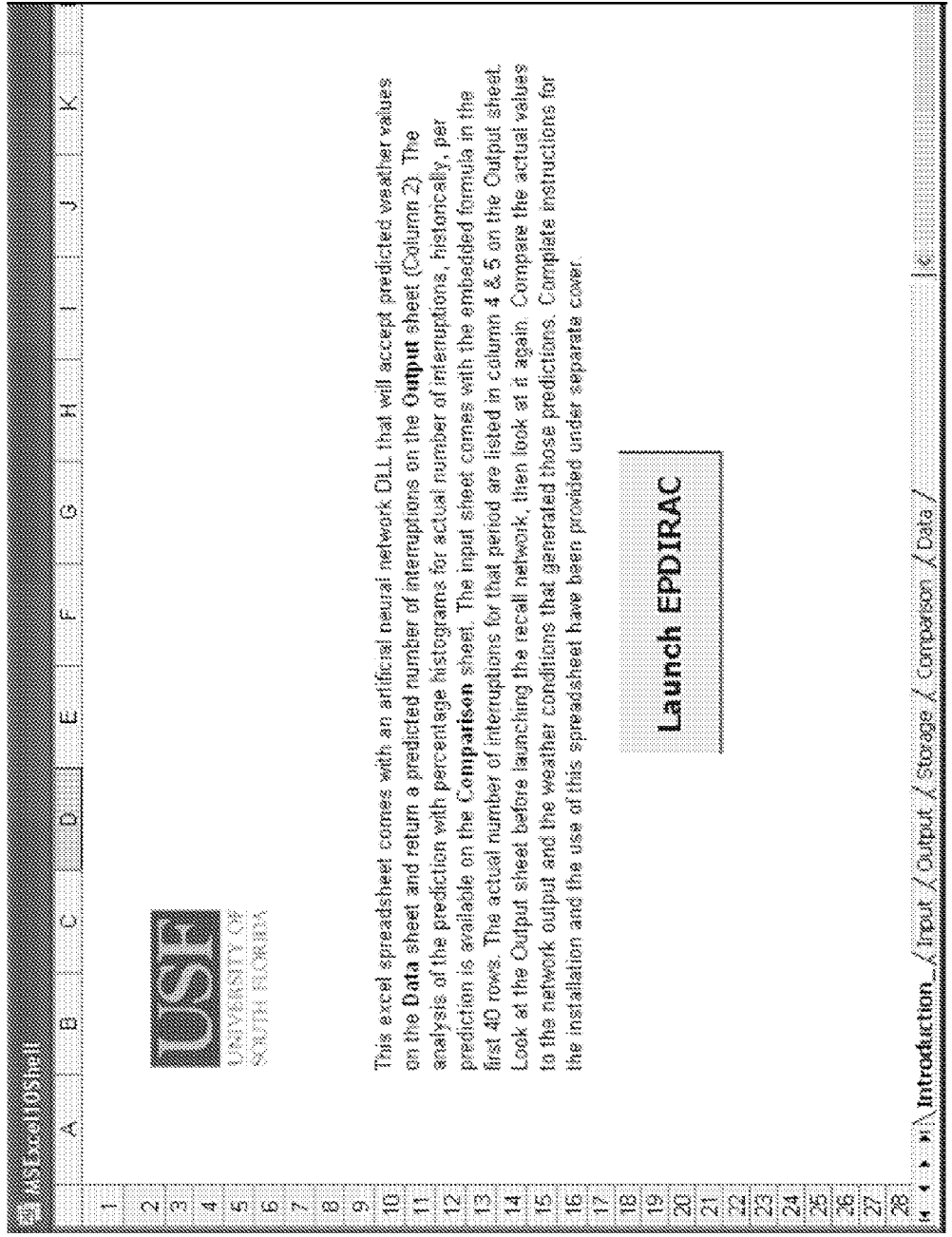
FIG. 23 is a screen shot of the 'Introduction' sheet of an application of the present invention in Microsoft Excel®.

As shown in FIG. 23, the 'Introduction' sheet gives a short explanation of the program itself and the predictor is launched from here. The 'Input' sheet is a programmed sheet, which is unchangeable by the user.

Figure 24:
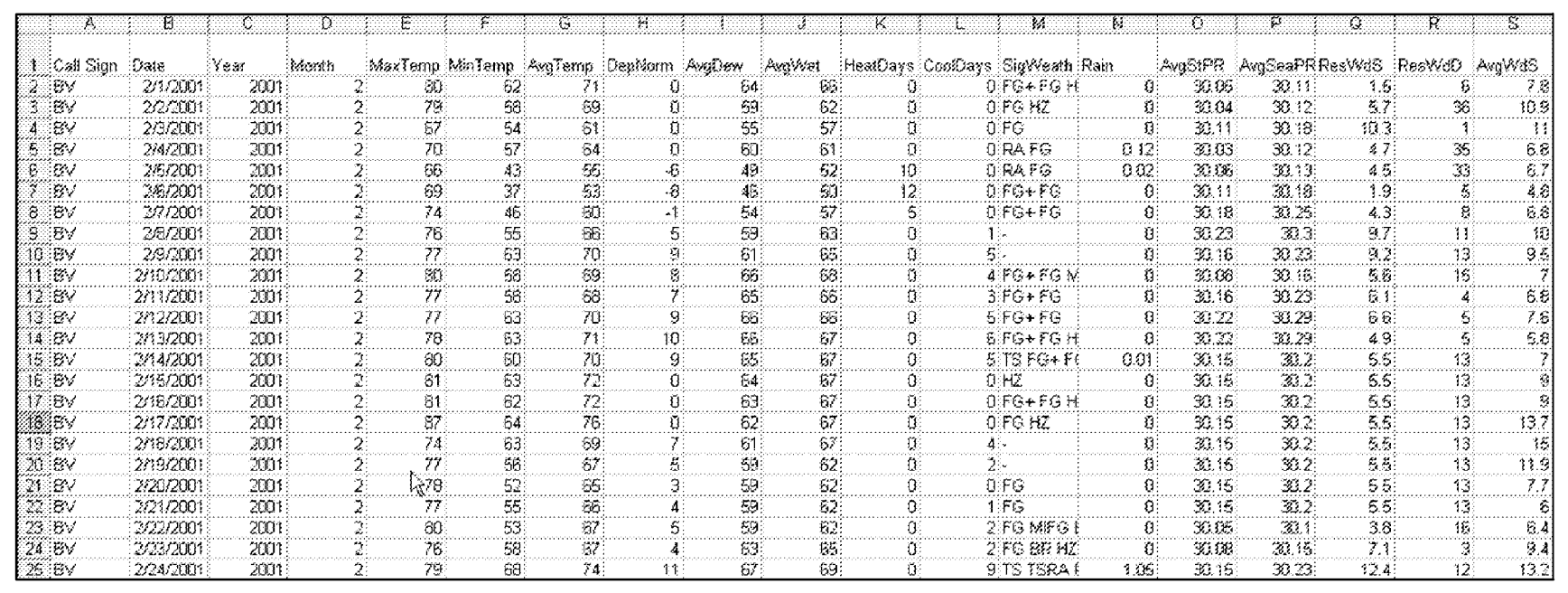

The 'Data' sheet is where the user inputs the weather data, such as maximum, minimum, and average temperature, lightning strikes, and amount of rain. A screen shot of a portion of a sample 'Data' sheet is shown in FIG. 24.

Figure 25B:
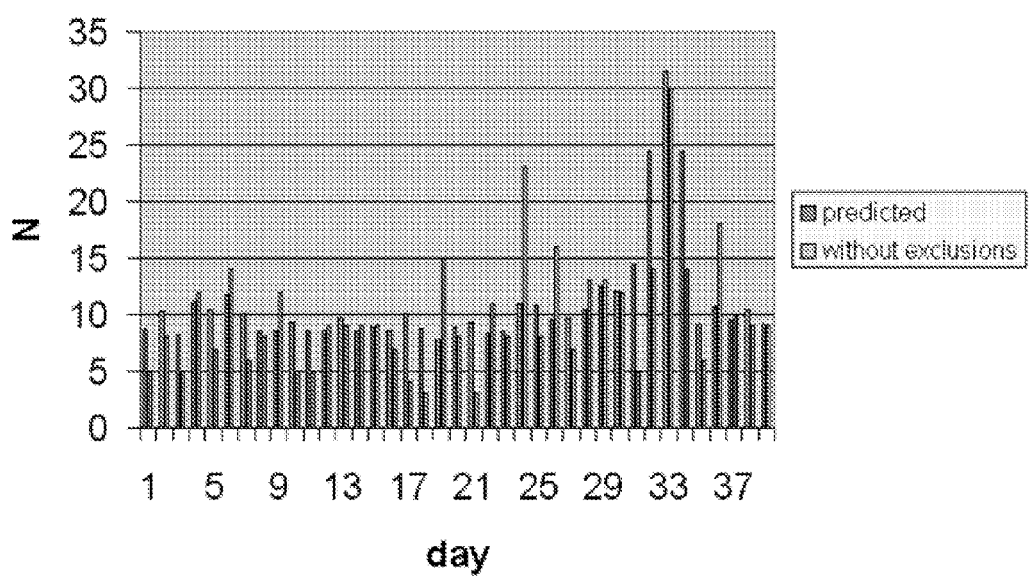
FIG. 25 is a series of partial screen shots of the 'Output' sheet of an application of the present invention in Microsoft Excel®.

The 'Output' sheet displays the results of the predictor. An example of the 'Output' sheet is shown in FIG. 25. The program implements an artificial neural network DLL that will accept predicted weather values entered on the 'Data' sheet and returns a predicted number of interruptions in column 2 (FIG. 25A) of the 'Output' sheet. The actual number of interruptions (without and with exclusions) is shown in the third and forth columns (FIG. 25A). To demonstrate its accuracy, the program also creates bar graphs, like the one shown in FIG. 25B, comparing the predicted number of interruptions with the actual number of interruptions.

The 'Storage' sheet allows the user to store results.

Figure 26A:
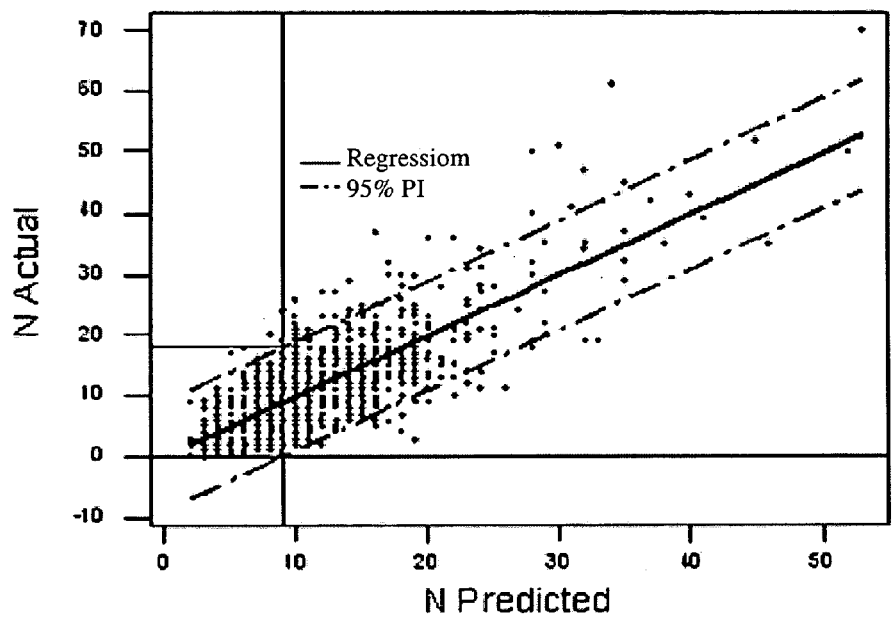
FIG. 26 is a series of partial screen shots of the 'Comparison' sheet of an application of the present invention in Microsoft Excel®.
Figure 26B:
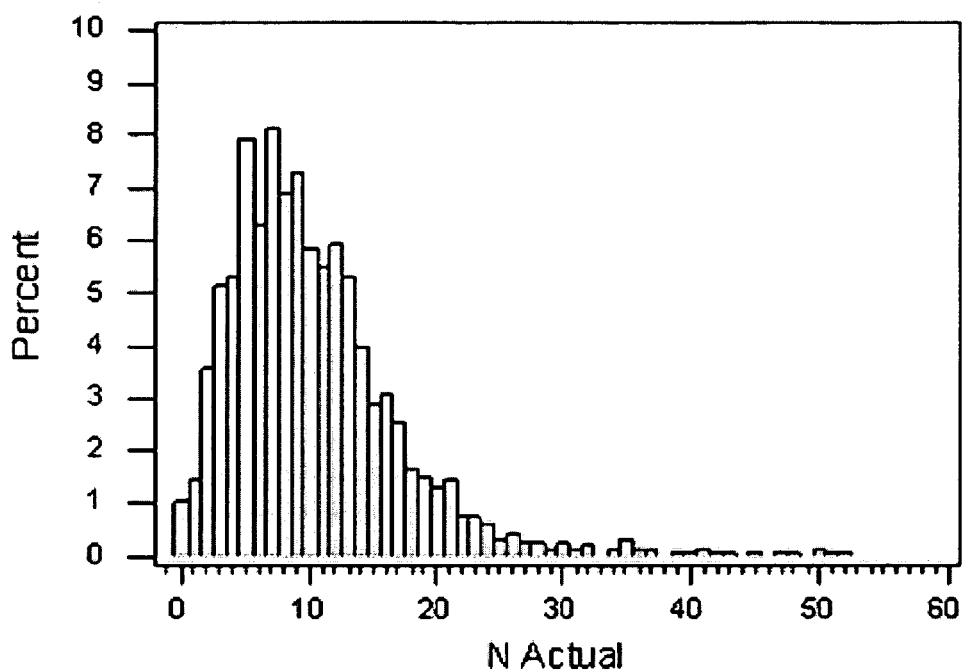
Figure 26C:
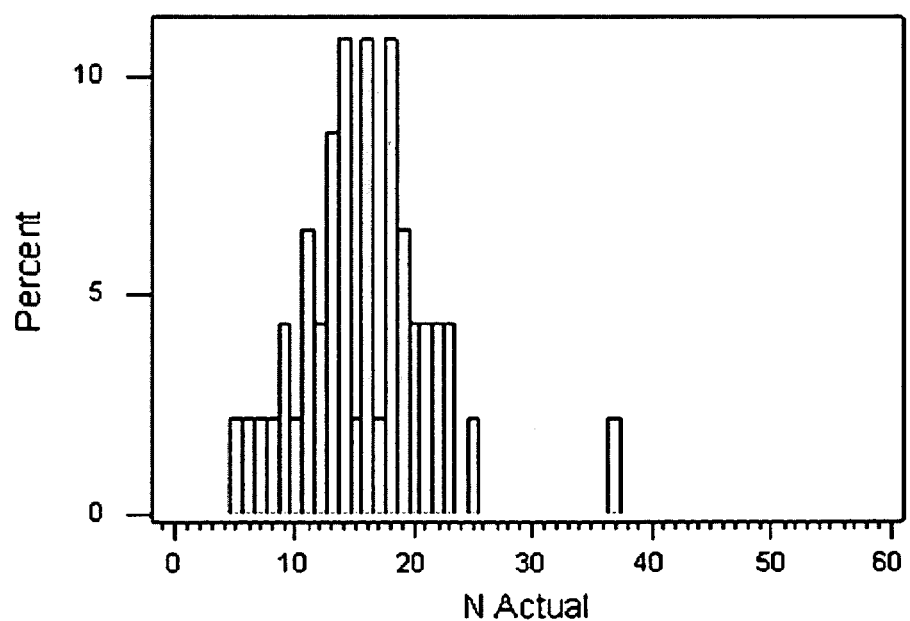

The analysis of the prediction with percentage histograms for actual number interruptions, historically, per prediction is available on the 'Comparison' sheet. Examples of graphs and tables displayed on the 'Comparison' sheet are shown in FIG. 26. FIG. 26A shows a regression plot of the actual verses predicted number of interruptions with 95% prediction intervals. The percentage of occurrences of actual values is also displayed on this sheet. For example, as shown in FIG. 26B, only 1% of the days entered on the input sheet had no interruptions, while 8% of the days had seven interruptions. The sheet also includes a graph showing the chance of having N interruptions provided a certain predicted value. For example, as shown in FIG. 26C where the prediction for that day was 16 interruptions, the chance of having 10 interruptions is just above 2% and the chance of having 18 interruptions is just above 10%. The sheet also provides tables that give the risk of N or more interruptions and N or less interruptions occurring for a certain predicted value. For example, as shown in FIG. 26D, when the predicted number of interruptions is 16, the chance of having 10 or fewer interruptions is 15.22% and the chance of having 18 or more interruptions is 39.13%.

Figure 27:
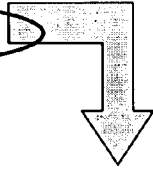
FIG. 27 is series of partial screen shots of an application of the present invention in Microsoft Excel®.
Figure 27:
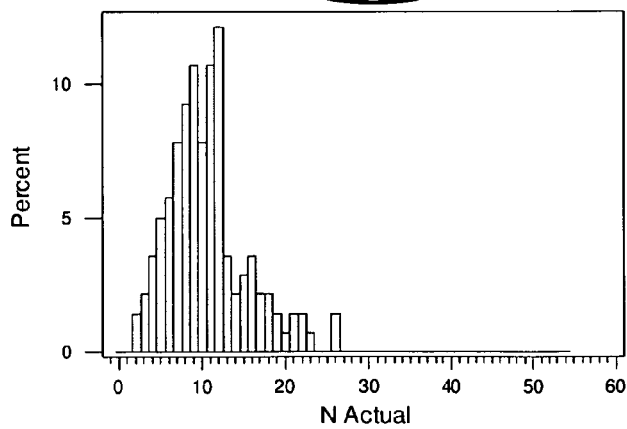

FIG. 27 is another example of the input and resulting analysis of the program. FIG. 27A shows the weather data for management area 'BV' on Feb. 1, 2001 used as input on the 'Input' data sheet. The resulting output that would be displayed on the 'Output' sheet is shown in FIG. 27B. 'Exemplar' represents the date and 'output1' is the predicted N, or the predicted number of occurrences for that date. Once the predicted N is known for the date in question, the 'Comparison' sheet is used to assess the risk of that predicted number of occurrences actually occurring. As shown in FIG. 27C, when the predicted number of occurrences is 10, 90% of the time the actual number of interruptions was between 5 and 17. The table in FIG. 27D gives the risk of N or fewer and the risk of N or greater interruption actually occurring when the predicted number was 10.

Figure 28:
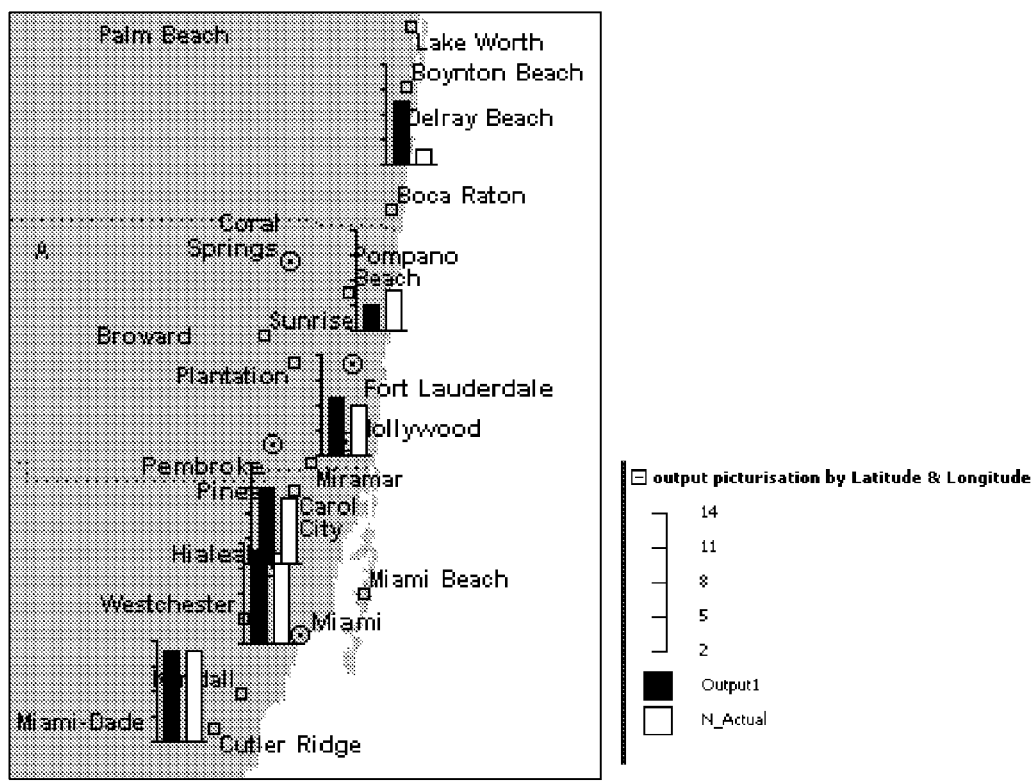
FIG. 28 is a mapping of six different locations and a comparison of their respective predicted and actual numbers of interruptions.

FIG. 28 demonstrates the accuracy of the predicted number of interruptions at six different locations in Florida by displaying a map including the locations with bar graphs displaying both the actual and predicted number of interruptions.

Conclusion

Several methods exist for modeling and predicting extreme weather condition failure rates, and there are methods that account for the baseline failure rates due to aging and other causes of equipment failure. Interruptions as a function of common weather conditions comprise a gap between those models, and the present invention will bridge that gap.

There is a hidden weather component, in most, if not all of the traditionally defined causes of interruptions as shown in FIG. 1. Additionally, the hidden component is amenable to stochastic analysis and the prediction of interruptions similar to that shown in FIG. 3. This novel method of reliability analysis can be applied to a broad range of environmental and climatic conditions.

The predictor method provides the power industry with an opportunity to reduce the downtime of power interruptions by proper distribution of the service work force. This will, in turn, improve short-term planning and optimize manpower. It can also help identify circuits and systems prone to failures due to common weather conditions. The model offers an economical tool with negligible maintenance costs to utility companies to improve its SAIFI and increase its power transmission. Short-term benefits to the power industry include efficient deployment of service staff, improved maintenance scheduling, and optimization of the number of staff members per shift and per region. Long-term benefits include an improved ability to explain to management and share holder about failures, improved SAIDI, efficient selection of equipment and manpower, improved predictions on whether new investment will bring the desired result, and elimination of dependency on annual average calculations for finding the number of interruptions. Until now, no other method was capable of assessing the probability of a specific range of interruptions for a region during common weather conditions.

This method can also be used for research into the relative reliability of a system under different weather conditions or at different times. Actual weather and interruption data can be used to train the predictor models and then theoretical weather data can be entered into the trained models. The predictions can be used to rate the robustness of a system to common weather conditions. In addition, this process can be repeated at intervals before and after maintenance or reliability enhancement programs are implemented. This will enable researchers to determine whether these programs are producing the desired results.

The normalization method has been shown to consistently and positively improve the correlations between the present year's reliability measures and the previous year's reliability measures. Since the adjustments were done solely on the basis of daily weather values, and accepting the logic presented above, it can be concluded that at least some part of the effects of weather on the reliability measures N, CI, and CMI have been accounted for, and that the measures have been normalized for weather.

Because the reliability measures have been normalized for common weather conditions, and reliability indices are calculated from the measures, it can be concluded that the reliability indices have been normalized as well.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A computer program product for enabling a computer to normalize reliability indices for common weather conditions in a target year with respect to a baseline year's reliability performance, comprising:

software instructions for enabling the computer to perform predetermined operations; and a computer readable medium bearing the software instructions;

the predetermined operations including:
compiling common weather data comprising a plurality of weather variables,
compiling interruption data,
determining outlier thresholds for the common weather conditions,
determining the outlier threshold for interruption data,
identifying outliers in common weather data for the target year,
identifying outliers in interruption data for the target year,
identifying outliers in common weather data for the baseline year,
identifying outliers in interruption data for the baseline year,
identifying outlier intersections of the target year,
identifying outlier intersections of the baseline year,
using a hyper geometric probability distribution to determine whether the weather outliers and interruption outliers are related or intersected randomly, and
adjusting the interruption data of the target year to account for the interference by common weather conditions, wherein the computer normalizes reliability indices for common weather conditions in a target year with respect to a baseline year's reliability performance.

2. The computer program product of claim 1, wherein common weather data comprises wind speed data, rain data, and lightening strikes data from the target year and the baseline year.

3. The computer program product of claim 2, wherein determining outlier thresholds for the common weather data comprises:

determining an outlier threshold for wind speed;
determining an outlier threshold for rain; and
determining an outlier threshold for lightening strikes.

4. The computer program product of claim 3, wherein determining an outlier threshold for wind speed comprises:

calculating the location and scale of the baseline year's wind speed data;
standardizing the target year's wind speed data using the location and scale of the baseline year's wind speed data; and
applying a percentage point function to the wind speed data.

5. The computer program product of claim 3, wherein determining an outlier threshold for rain comprises:

calculating the mean and standard deviation of a normal distribution of the rain data; and
adding the mean to a multiple of the standard deviation, wherein the multiple used depends on the rain data and must be large enough to capture the rain data from days where rain was heavy.

6. The computer program product of claim 3, wherein determining an outlier threshold for lightening strikes comprises:
 calculating the mean and standard deviation of a normal distribution of the lightning strike data; and
 adding the mean to a multiple of the standard deviation, wherein the multiple used depends on the lightning strike data and must be large enough to capture the lightning strikes data from days where amount of lightening strikes was large.

7. The computer program product of claim 1, wherein interruption data comprises the number of interruptions, number of customers interrupted, number of customer minutes interrupted.

8. The computer program product of claim 1, wherein outliers of common weather data and outliers of interruption data are identified in comparisons between each month of the baseline year and the same month in the target year.

9. The computer program product of claim 1, wherein the interruption data is segmented to exclude administrative and exclusionary interruptions.

10. The computer program product of claim 1, wherein determining the outlier threshold for interruption data comprises:
 transforming target year interruption data by taking its natural log;
 determining the mean, $\alpha$, of the transformed target interruption data;
 determining the standard deviation, $\beta$, of the transformed target interruption data; and
 calculating according to the formula $\alpha+A\beta$, where A is the number of standard deviations.

11. The computer program product of claim 1, wherein identifying outliers in common weather data for the target year comprises:
 identifying days of the target year whose common weather condition data values exceeded the baseline year's weather outlier threshold.

12. The computer program product of claim 1, wherein identifying outliers in interruption data for the target year comprises identifying days of the target year whose interruption data values above the baseline year's interruption outlier threshold.

13. The computer program product of claim 1, wherein identifying outliers in common weather data for the baseline year comprises identifying days of the baseline year whose weather data values exceeded the target year's weather outlier threshold.

14. The computer program product of claim 1, wherein identifying outliers in interruption data for the baseline year comprises identifying days of the baseline year whose interruption data values above the target year's interruption outlier threshold.

15. The computer program product of claim 1, wherein identifying outlier intersections of the target year comprises
 comparing weather outliers of the target year and interruption outliers of the target year; and
 identifying where the outliers are the same day.

16. The computer program product of claim 1, wherein identifying outlier intersections of the baseline year comprises:
 comparing weather outliers of the baseline year and baseline outliers of the target year; and
 identify where the outliers are the same.

17. The computer program product of claim 1, wherein adjusting the interruption data of the target year to account for the interference by common weather conditions comprises:
 subtracting the outlier intersections of the target year; and adding the outlier intersection of the baseline year.

18. The computer program product of claim 1, wherein adjusting the interruption data of the target year is done daily.

19. A computer system adapted to normalize reliability indices for common weather conditions in a target year with respect to a baseline year's reliability performance, comprising:
 a processor; and
 a memory including software instructions that cause the computer system to perform:
  compiling common weather data comprising a plurality of weather variables,
  compiling interruption data,
  determining outlier thresholds for the common weather conditions,
  determining the outlier threshold for interruption data,
  identifying outliers in common weather data for the target year,
  identifying outliers in interruption data for the target year,
  identifying outliers in common weather data for the baseline year, identifying outliers in interruption data for the baseline year,
  identifying outlier intersections of the target year,
  identifying outlier intersections of the baseline year,
  using a hyper geometric probability distribution to determine whether the weather outliers and interruption outliers are related or intersected randomly, and
  adjusting the interruption data of the target year to account for the interference by common weather conditions,
 wherein the computer normalizes reliability indices for common weather conditions in a target year with respect to a baseline year's reliability performance.

20. The computer system of claim 19, wherein common weather data comprises wind speed data, rain data, and lightening strikes data from the target year and the baseline year.

21. The computer system of claim 19, wherein interruption data comprises the number of interruptions, number of customers interrupted, number of customer minutes interrupted.

22. The computer system of claim 19, wherein outliers of common weather data and outliers of interruption data are identified in comparisons between each month of the baseline year and the same month in the target year.

23. The computer system of claim 19, wherein the interruption data is segmented to exclude administrative and exclusionary interruptions.

24. The computer system of claim 19, wherein determining outlier thresholds for the common weather data comprises:
 determining an outlier threshold for wind speed;
 determining an outlier threshold for rain; and
 determining an outlier threshold for lightening strikes.

25. The computer system of claim 24, wherein determining an outlier threshold for wind speed comprises:
 calculating the location and scale of the baseline year's wind speed data;
 standardizing the target year's wind speed data using the location and scale of the baseline year's wind speed data; and
 applying a percentage point function to the wind speed data.

26. The computer system of claim 24, wherein determining an outlier threshold for rain comprises:
 calculating the mean and standard deviation of a normal distribution of the rain data; and adding the mean to a multiple of the standard deviation, wherein the multiple used depends on the rain data and must be large enough to capture the rain data from days where rain was heavy.

27. The computer system of claim 24, wherein determining an outlier threshold for lightening strikes comprises:
   calculating the mean and standard deviation of a normal distribution of the lightning strike data; and
   adding the mean to a multiple of the standard deviation, wherein the multiple used depends on the lightning strike data and must be large enough to capture the lightning strikes data from days where amount of lightening strikes was large.

28. The computer system of claim 19, wherein determining the outlier threshold for interruption data comprises:
   transforming target year interruption data by taking its natural log;
   determining the mean, $\alpha$, of the transformed target interruption data;
   determining the standard deviation, $\beta$, of the transformed target interruption data; and
   calculating according to the formula $\alpha + A\beta$, where A is the number of standard deviations.

29. The computer system of claim 19, wherein identifying outliers in common weather data for the target year comprises:
   identifying days of the target year whose common weather condition data values exceeded the baseline year's weather outlier threshold.

30. The computer system of claim 19, wherein identifying outliers in interruption data for the target year comprises identifying days of the target year whose interruption data values above the baseline year's interruption outlier threshold.

31. The computer system of claim 19, wherein identifying outliers in common weather data for the baseline year comprises identifying days of the baseline year whose weather data values exceeded the target year's weather outlier threshold.

32. The computer system of claim 19, wherein identifying outliers in interruption data for the baseline year comprises identifying days of the baseline year whose interruption data values above the target year's interruption outlier threshold.

33. The computer system of claim 19, wherein identifying outlier intersections of the target year comprises
   comparing weather outliers of the target year and interruption outliers of the target year; and
   identifying where the outliers are the same day.

34. The computer system of claim 19, wherein identifying outlier intersections of the baseline year comprises:
   comparing weather outliers of the baseline year and baseline outliers of the target year; and
   identify where the outliers are the same.

35. The computer system of claim 19, wherein adjusting the interruption data of the target year to account for the interference by common weather conditions comprises:
   subtracting the outlier intersections of the target year; and
   adding the outlier intersection of the baseline year.

36. The computer system of claim 19, wherein adjusting the interruption data of the target year is done daily.

\* \* \* \* \*